US009772513B2

United States Patent
Qi

(10) Patent No.: US 9,772,513 B2
(45) Date of Patent: Sep. 26, 2017

(54) SIMULATION SYSTEM FOR WEARING SPECTACLES, A SIMULATION DEVICE FOR WEARING SPECTACLES AND A SIMULATION PROGRAM FOR WEARING SPECTACLES

(71) Applicant: HOYA CORPORATION, Tokyo (JP)

(72) Inventor: Hua Qi, Hamura (JP)

(73) Assignee: HOYA CORPORATION, Tokyo (JP)

( * ) Notice: Subject to any disclaimer, the term of this patent is extended or adjusted under 35 U.S.C. 154(b) by 32 days.

(21) Appl. No.: 13/770,218

(22) Filed: Feb. 19, 2013

(65) Prior Publication Data

US 2013/0215382 A1 Aug. 22, 2013

(30) Foreign Application Priority Data

Feb. 16, 2012 (JP) .................................. 2012-032156
Feb. 16, 2012 (JP) .................................. 2012-032157

(51) Int. Cl.
*G02C 13/00* (2006.01)

(52) U.S. Cl.
CPC ........... *G02C 13/003* (2013.01); *G02C 13/00* (2013.01)

(58) Field of Classification Search
CPC ...... G02C 13/003; G02C 13/005; A61B 3/04; A61B 3/09
USPC .......... 351/203, 204, 227, 239, 246, 159.75, 351/159.76; 345/629, 630; 703/2, 11
See application file for complete search history.

(56) References Cited

U.S. PATENT DOCUMENTS

| 6,142,628 A * | 11/2000 | Saigo ................... G02C 13/003 351/204 |
| 6,637,880 B1 * | 10/2003 | Yamakaji ............... G02C 7/027 351/159.75 |
| 2003/0156125 A1 | 8/2003 | Welk et al. |
| 2010/0198515 A1 * | 8/2010 | Becken .................. G02C 7/024 702/1 |

FOREIGN PATENT DOCUMENTS

| EP | 1 136 869 A1 | 9/2001 |
| JP | A-06-139318 | 5/1994 |
| JP | 2008-077098 A | 4/2008 |
| WO | WO 00/16683 | 3/2000 |

OTHER PUBLICATIONS

May 28, 2013 Extended European Search Report issued in European Application No. 13155407.3.

* cited by examiner

*Primary Examiner* — Ricky Mack
*Assistant Examiner* — Gary O'Neill
(74) *Attorney, Agent, or Firm* — Oliff PLC

(57) ABSTRACT

A simulation system for simulating an appearance of a wearer's face wearing spectacles with accurate eye scaling includes a spherical component calculator that calculates a spherical component of a lens of the spectacles, the lens having an aspherical optical surface. The system further includes a simulation image generator that generates a simulation image of the wearer's face wearing the spectacles including accurately scaled eyes based on lens location information of the spectacles when worn and the spherical component. The system further includes a simulation image displaying unit that displays the simulation image. The lens location information includes a distance between a portion of an eye of the wearer and an eye-side surface of the lens.

6 Claims, 5 Drawing Sheets

(a)

(b)

SIMULATION SYSTEM FOR WEARING SPECTACLES, A SIMULATION DEVICE FOR WEARING SPECTACLES AND A SIMULATION PROGRAM FOR WEARING SPECTACLES

BACKGROUND OF THE INVENTION

Technical Field

This invention relates to a simulation system for wearing spectacles, a simulation device for wearing spectacles and a simulation program for wearing spectacles, particularly to a simulation technique for wearing spectacles in order to provide someone wearing spectacles with experience of an eye image capable of being observed in time of wearing spectacles.

Description of Related Art

Normally, when a wearing person wears spectacles, the eye looks smaller in case of a lens for myopia, and the eye looks larger in case of a lens for hyperopia, owing to refraction by a spectacle lens. In a simulation device for wearing spectacles before a conventional art, regarding a synthesized image, the refraction by the lens was not sufficiently taken in consideration. Thus, regarding eye image's size capable of being observed in time of wearing spectacles, even if the simulation is performed, there is a possibility that the simulation result reflected with effects of an actual spectacle lens can not be obtained.

To the situation before a conventional art, a technique is known, based on a method of taking a statistic image of client's face without a spectacle frame by a video camera etc and then synthesizing the image with a previously recorded spectacle frame image and displaying it (for example, see document 1). Specifically, as shown in specification [0012], FIG. 4 and FIG. 5 in document 1, in the spectacle lens with an object side surface (called "front surface" thereafter) and an eye side surface (called "back surface" thereafter), a distance between a center of thickness and a characteristic point of the eye's outline, and lens power, are taken into consideration when the simulation is performed.

PRIOR ART DOCUMENT

Patent Document

[Patent document 1] Japanese Laid document 1994-139318

SUMMARY OF THE INVENTION

As a spectacle lens, other than a monofocal lens with a conventional spherical surface or toric surface (simply called "spherical lens" thereafter), an aspherical monofocal lens and a progressive lens of changing the power, can be given for example. Furthermore, in these days, it is appeared something called as a personalized lens in which a different shape surface is used according to a personalized parameter for each patient even if the lens power is same. In the lens including the complex surfaces (about the said lens and a lens other than the "spherical lens", simply called "aspherical lens" thereafter), a trace of incident light from the front surface and exiting light from the back surface, is greatly different from that in the spherical lens.

When the patients get check the eye at a spectacle shop, decide a frame and wear an actually made spectacle, it is ideal to confirm their look of face including the scaling of the eye. In addition, deformation of the image within the frame has to be reappearance precisely, as reflecting with a personalized designed surface based on a specific value of a prescribed power and a lens position etc.

Furthermore, a series of the process has to be completed possibly in a short minute in order not to get the patients to wait for a long time.

However, there are a lot of problems for satisfying the said requests. In particular, there are two following problems.

One is a problem about "increasing an amount of information". In the first place, as a method of precisely reappearing deformation of the image within the frame, for all pixels, a position (a position of a former image) that a light ray passing through position on the frame crosses with the face (around the eye) has to be calculated by skew ray trace. The ray trace for an aspherical surface is required for a lot of calculation, thus when we do it for all pixels, a lot of calculating time is needed.

Of course, when we have an actual spectacle lens (aspherical lens) satisfying all the prescribed values of the patient, the client can try it at the spectacle shop etc, and then confirm the scaling of the eye actually. However, in the aspherical lens, an optical surface shape is determined according to the prescription of the patient. Namely, the spectacle lens is manufactured based on an order-made (custom-made) of the wearer and is reflected with the prescription of each wearer. Thus, the surface shape of the aspherical lens is so complex shape. Therefore, it is not realistic that the aspherical lens including the greatly complex shape is manufactured just for trying to wear.

Furthermore, it is considered that eye scaling is simulated based on a surface shape data of the aspherical lens. However, as described above, the surface shape of the aspherical lens is so complex. That causes greatly increasing of the surface shape data. Therefore, a spectacle lens manufacturer has to prepare enormous quantities of the data for just simulation of the eye scaling. Furthermore, a situation that the spectacle lens shop has to treat the enormous data, is considered. In conclusion, a burden increases for not only the spectacle lens manufacturer but also the spectacle lens shop.

Another one is a problem about "a risk of leaking technical information". In the first place, in order to make the ray trace possible, a precise surface shape data has to be obtained. This data includes technical information of a maker, therefore we have to prevent the technical information from leaking. When calculation of the scaling of the eye is performed by a server of the spectacle lens manufacture maker, the spectacle lens manufacture maker can take care of preventing the technical information from leaking by itself. However, when calculation of the scaling of the eye is performed by a PC in the spectacle shop or a server of an outsourcing network service company, there is a risk of leaking a detail surface data of the aspherical lens, being a core of the technical information, from the PC or server. Therefore, the spectacle lens manufacturing maker has to prepare a system like a safety net for taking care of the said case.

Note that, in a conventional simulation method based on a monofocal lens, there is a possibility that deformation of shape around the eye within the frame capable of being observed in time of wearing the spectacle lens with the aspherical surface can not be precisely simulated. As described in patent document 1, in a method based on a near axis ray trace, the eye image is made enlarged or small according to a regular scaling factor. We have to say that it is greatly different from the fact. Even if in the spherical lens, as shown by the presence of a distortion astigmatism, a scaling factor around an optical axis and a scaling factor of the lens surrounding portion are different from each other and are not regular.

Therefore, in a conventional simulation method based on the spherical lens, there is a possibility that the scaling of eye image capable of being observed in time of wearing the spectacle lens with the aspherical surface (called "scaling of the eye image" thereafter) can not be precisely simulated.

Deterioration of the simulation accuracy causes an affair that, when the third person looks at a wearer, the wearer's eye looks larger (or smaller) than the wearer's eye image simulated at the spectacle shop. Thus, it causes a result different from an expecting look of the wearer, and in some cases, it causes an affair of deterioration of the look. Furthermore, the wearer has complaints to the spectacle shop and the spectacle lens manufacturer. Therefore, there is a possibility that the spectacle shop and the spectacle lens manufacturer can not obtain an enough customer satisfaction.

Thus, an object of the present invention is to provide a simulation system for wearing spectacles, a simulation device for wearing spectacles and a simulation program for wearing spectacles, capable of comparatively simply realizing a precise simulation of the eye image capable of being observed in time of wearing spectacles with the aspherical shape and reducing a possibility of leaking the spectacle lens information.

Means for Solving the Object

Under a situation that we have to take care of providing a customized spectacle lens for each of the wearer, complicating the optical surface shape by applying the aspherical surface to the spectacle lens and increasing the data related to the aspherical surface of the optical surface of the spectacle lens, the inventors greatly researched about a way of getting the customer's satisfaction, to thereby confront the said problem with no one confronted. Then, the inventors examined the simulation of the scaling of the eye image in the aspherical lens. Therefore, the inventors conceived a method capable of simulating the scaling of the eye image by calculating an aspherical component parameter, without the detail surface shape of the aspherical lens.

Specifically, as described above, when the inventors examine a method of calculating the eye's scaling effect in the aspherical lens in a short time, providing the eye's scaling effect to the wearer, and letting the wearer check the eye's scaling effect, without the aspherical shape data, the inventors conceived that "the eye's scaling effect in the spectacle lens is calculated by a scaling parameter". Furthermore, the inventors conceived that the scaling parameter can be shown as the aspherical component parameter, and that the aspherical component parameter can be shown by "origination information" and "gradient information" for example. In addition, the inventors conceived that "the scaling parameter in the aspherical lens can be resolved into a component caused by the based spherical lens and a component caused by the aspherical effect". The scaling parameter by the spherical lens ("a spherical component parameter") can be calculated by a method of the ray trace etc. On the other hand, the scaling parameter by the aspherical effect ("a correcting component parameter") can be calculated by a method of for example being pre-provided by the maker before. Based on that, the inventors also conceived a method of precisely calculating the scaling of the eye image from the correcting component parameter obtained by a method of for example being pre-provided by the maker before, in addition to the spherical component parameter obtained comparatively easily. Namely, the inventors also conceived a method of making it possible to simulate the scaling of the eye image with just the spherical component parameter and the correcting component parameter for correcting the spherical component parameter, even if the detail surface data of the aspherical lens is unknown.

As described below, the present invention is conceived based on the said new idea by the inventor.

One embodiment of the present invention is a simulation system for wearing spectacles, providing wearer with simulated-experience of an eye image capable of being observed in time of wearing spectacles, comprising, a simulation image generating means of generating a simulation image reflected with an scaling of the eye image capable of being observed in time of wearing spectacles, based on aspherical component parameter being a basis of the scaling of the eye image capable of being observed in time of wearing spectacles with at least one of optical surfaces aspherical.

Another embodiment is a simulation device for wearing spectacles, providing wearer with simulated-experience of an eye image capable of being observed in time of wearing spectacles, comprising, a simulation image generating means of generating a simulation image reflected with an scaling of the eye image capable of being observed in time of wearing spectacles, based on aspherical component parameter being a basis of the scaling of the eye image capable of being observed in time of wearing spectacles with at least one of optical surfaces aspherical.

Another embodiment is a simulation program for wearing spectacles, providing the wearer with simulated-experience of an eye image capable of being observed in time of wearing spectacles, making a computer work as, a simulation image generating means of generating a simulation image reflected with an scaling of the eye image capable of being observed in time of wearing spectacles, based on aspherical component parameter being a basis of the scaling of the eye image capable of being observed in time of wearing spectacles with at least one of optical surfaces aspherical.

Effect of the Invention

The present invention can comparatively simply realize a precise simulation of the eye image capable of being observed in time of wearing spectacles with the aspherical shape and reducing a possibility of leaking the spectacle lens information.

DETAILED DESCRIPTION OF THE INVENTION

Embodiment of this Invention

Figure 1:
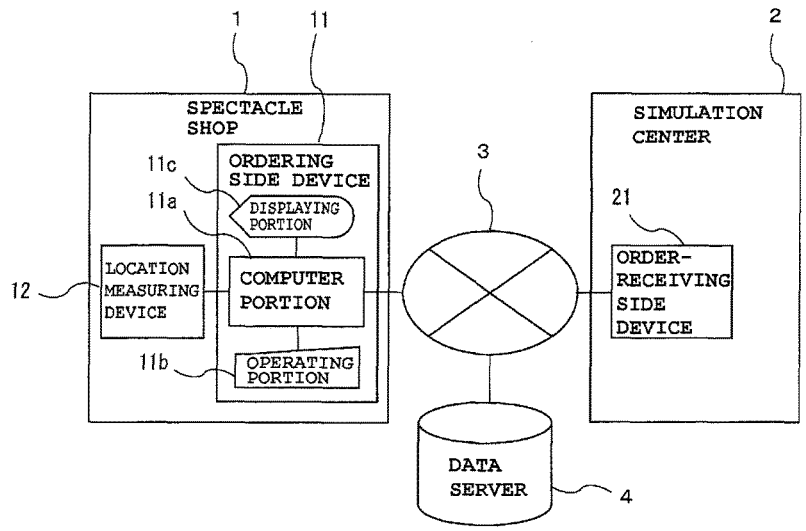
FIG. 1 is a block view, showing a constitution example of the entire simulation system for wearing spectacles of this embodiment.

Embodiment of this invention will be described in detail as below.

This embodiment with the aspherical lens used as the spectacle lens, will be described in the following sequence.

1. Constitution example of all the simulation system for wearing spectacles
2. Functional constitution example of the ordering side device
3. Functional constitution example of the order-receiving side device
   A) Mechanism of the simulation
   B) Each means for specifically realizing the simulation
4. Procedure of the simulation
5. Simulation program
6. Method for providing simulation information for wearing spectacles
7. Effect of this embodiment
8. Modified Example Further, as an another embodiment, [Embodiment 2] (simplifying a method of calculating the correcting component parameter), [Embodiment 3] (skipping a ray trace calculation of the spherical component parameter) and [Embodiment 4] (simplifying a calculation of the aspherical component parameter of both surfaces aspherical lens), will be given.

Embodiment 1

1. Constitution Example of all the Simulation System for Wearing Spectacles FIG. 1 is a block view, showing a constitution example of the entire simulation system for wearing spectacles of this embodiment.

In the system constitution of the figure example, a spectacle shop 1 in an ordering side of the simulation and a simulation center 2 in a spectacle lens maker in an order-receiving side of the simulation, are connected through a communication line 3 like an internet etc. Note that, although the figure example shows a situation of only one spectacle shop 1, a plurality of the spectacle shops 1 are actually connected with the simulation center 2 through the communication line 3.

The ordering side device 11 is set at the spectacle shop 1. The ordering side device 11 includes a computer portion 11a, an operating portion 11b and a simulation image displaying portion 11c. Then, the computer portion 11a is made of combination of CPU (Central Processing Unit), RAM (Random Access Memory), HDD (Hard Disk Drive) etc, with a processing function as a computer. The operating portion 11b is made of keyboard, mouse and touch panel etc, and carries out information input to the computer portion 11a. The simulation image displaying portion 11c is made of display device and carries out image displaying according to a command from the computer portion 11a. Note that "simulation image displaying portion 11c" is simply called "displaying portion 11c" thereafter. Thus, the computer portion 11a is connected to the communication line 3 through a not-shown router etc in the drawing, and is constituted so as to make it possible to receive a data with other devices through the communication line 3.

Furthermore, a device 12 for measuring lens location information in front of the eye (simply called location measuring device 12 thereafter) is connected with the ordering side device 11 at the spectacle shop 1. The location measuring device 12 measures an actual positioning relation between at least a part of a portion forming a wearer's eye shape and the back surface of the spectacle lens in time of wearing the spectacle lens. Specifically, the location measuring device 12 is for measuring information (called "lens position information" thereafter) about each with actual distance from the spectacle lens back surface to a cornea, "tilted forward angle" and "tilted inside angle" or combination thereof, of the spectacle lens in time of wearing the spectacle lens. Note that, for example the actual distance means a distance d between an top point with an origination plane and the back surface crossed each other and top position of the cornea (the distance d is called "distance d between the top points" or simply "distance d"). Note that a known device can be used as the location measuring device 12.

The order-receiving side device 21 is set at the simulation center 2. The order-receiving side device 21 is constituted so as to have a function as a computer. Thus, order-receiving side device 21 is connected to the communication line 3 through a not-shown router in the drawing, to thereby make it possible to receive a data with other device (for example the ordering side device 11) on the communication line 3.

Furthermore, in the simulation center 2, a data recording means 77 (as described below in FIG. 3) with a received data 66 is connected to the order-receiving side device 21 through a communication line like LAN (Local Area Network) etc. The data recording means 77 also records information capable of becoming necessary for calculating the aspherical component parameter. For example, information about a variety or serial number of the spectacle lens and information about the spherical component parameter and the correcting component parameter already calculated according to a type or series number of the spectacle lens, can be given as the above information. Note that, as described below, the order-receiving side device 21 may be connected through the communication line 3 to the data server 4 instead of the data recording means 77.

Further, for example, "spherical component" indicates optical functions brought by the spherical lens. The spherical component includes spherical shape and spherical element. The spherical element is described after. Note that, "aspherical component" indicates optical functions brought by the aspherical lens. The aspherical component includes aspherical shape and aspherical element. The aspherical element is described after.

Note that in addition to the order-receiving side device 21, a lens shape machining device, a database, a machining device like a curve generator and a polishing machine etc, and other terminal computers etc (not shown at all in the drawing), can be separately set at the simulation center 2.

Further, the data server 4 constituted so as to be accessed from the ordering side device 11 of the spectacle shop 1, is set on the communication line 3. The data server 4 records and saves spectacle lens information 64.

Note that a set position of the data server 4 is not restricted. Namely, a case of making a database etc (not shown in the drawings) serve as a data server 4 can be considered, when lens information (as described below) is recorded, saved and accessible from the ordering side device 11.

Note that, in this specification, "user device" mainly means a device for the spectacle shop 1 side. Further, "server device" means a device or the data server 4 for a lens manufacturing side or the simulation center 2 side, being a network service providing side outsourced by the maker. The user device is set at the shop. And the server device is set separately, connecting with the user device.

In the simulation system for wearing spectacles as described above, ordering the simulation is performed in the following procedure at the spectacle shop 1.

First, at the spectacle shop 1, lens information related to someone (called "wearer" thereafter) planning to purchase the spectacle lens and provided with simulated-experience of a situation of wearing the spectacle lens, is obtained. For example, a lens prescription necessary for the wearer is obtained by examining the eye, and the wearer chooses a type of the lens or refractive index. Then, the wearer chooses their favorite frame, and the wearer wears the frame so as to fit a shape of the wearer's face or head (pre-fitting). In this stage, it is important to precisely determine an eye point position on a working lens of the frame. The eye point is a standard for setting the lens into the frame. Further, in a status of the pre-fitting, lens location information of the working lens is measured.

Thereafter, a shopper operates the operating portion 11b of the ordering side device 11 and inputs a data related to a lens shape of the spectacle frame desired by the wearer (lens shape in a plane view etc), a lens prescription (simply called "prescription" thereafter), and lens location information etc. Thus, the computer portion 11a of the ordering side device 11 transmits the input data to the order-receiving side device 21 through the communication line 3.

Thereafter, in the side of the simulation center 2, the order-receiving side device 21 receives an order from the ordering side device 11. Thus, while the database 23 connected to the order-receiving side device 21 is referred, in the order-receiving side device 21, the correcting component parameter required for determining a shape of the optical surface of the spectacle lens is calculated, and finally the aspherical component parameter is calculated. On a basis of the aspherical component parameter, the simulation image reflected with "scaling of the eye image", is generated.

Thereafter, the simulation image is transmitted to the spectacle shop 1, and finally the image is displayed on the displaying portion 11c. It gives the wearer simulated-experience of the eye image capable of being observed in time of wearing the spectacles.

Note that, although an image capable of displaying mainly on the displaying portion 11c is taken in consideration as "simulation image" in this embodiment, the scaling of the eye image may be displayed by projecting a three dimensional stereoscopic vision. Further, although described in detail as follow, in this embodiment, multiple sample points and multiple parts with light radiated are prepared, and "origination information" by using a result of the ray trace calculation on the multiple part is obtained, to thereby simulate the scaling of the eye image by using the origination information. Note that the origination information means a sample points coordinates (y, z) and an imaginary exiting origination point coordinates ($y_1'$, $z_1'$) as described below in detail. Thus, it is possible to precisely reappear the scaling on each part of the eye image, to thereby improve a simulation accuracy of the scaling of the eye image.

2. Functional Constitution Example of the Ordering Side Device

Next, a functional constitution of the ordering side device 11 will be described.

Figure 2:
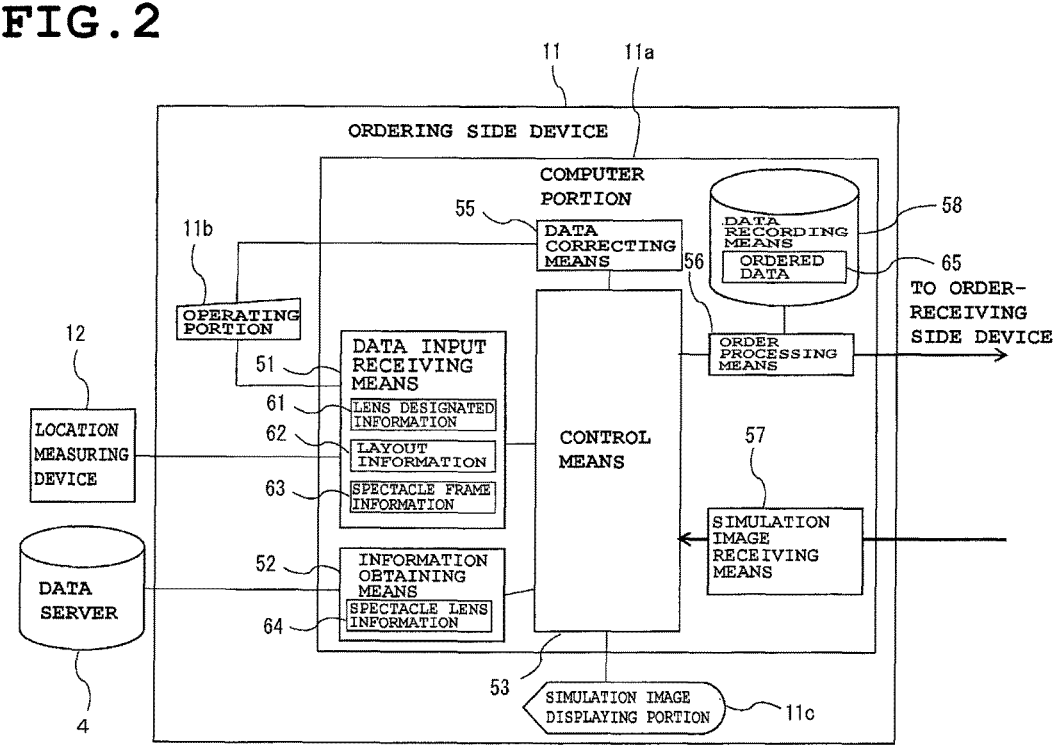
FIG. 2 is a block view, showing a functional constitution example of an ordering side device in the simulation system for wearing spectacles of this embodiment.

FIG. 2 is a block view, showing a functional constitution example of an ordering side device in the simulation system for wearing spectacles. As shown in the drawing, the computer portion 11a of the ordering side device 11 is constituted so as to work as a data input receiving means 51, an information obtaining means 52, a control means 53, a data correcting means 55, a simulation received order processing means 56 (simply called "received order processing means 56" thereafter), a simulation image receiving means 57 and a data recording means 58.

As described above, in this embodiment, "lens location information" is preliminarily obtained for the ordering side device 11 in a stage of simulating the scaling of the eye image, and then the lens location information is input to the data input receiving means 51. Thus, even if there is not a detail data of a specific optical surface shape of the spectacle lens, the simulation image is generated by the simulation image generating means, without the detail surface data of the spectacle lens. The above contents are one of characteristics of this embodiment.

Note that, although described again, for example, "lens location information" indicates the tilted forward angle, the tilted inside angle and the distance d between the top points. In summary, in a view of the plane vertical to an optical axis direction with light incident to the spectacle lens, "lens location information" indicates information based on calculation of a change from a position with light incident to the spectacle lens to a position with the light exited from the spectacle lens.

The data input receiving means 51 is for receiving lens information input from the operating portion 11b of the ordering side device 11 and information input from the location measuring device 12. In some cases, as the spectacle shop 1 accesses the data server 4 as necessary, information required for calculating the aspherical component parameter later, may be obtained, then the obtained information may be input to the data input receiving means 51.

Note that the lens information input from the operating portion 11b comprises lens designated information 61, layout information 62, spectacle frame information 63 and spectacle lens information 64.

The lens designated information 61 is required for identifying a spectacle lens desired for the wearer, and specifically constituted by information for designating a spectacle lens maker and a lens serial number and a lens prescription value etc. The prescription value is a power value with the spectacle lens treated to be adjusted for the wearer to view environment, and specifically is a right and left eye spherical power, toric (astigmatism) power, a tonic (astigmatism) axis value, a prism power and an additional power etc. Note that the lens designated information 61 is not limited if the lens designated information 61 can identify the lens, and may be comprised of items other than the abovementioned items.

The layout information 62 is required for matching the lens optical center to a position of the wearer's pupil, and shows a fitting point (eye point) position based on the geometric center (frame center) of the spectacle frame. Specifically, the layout information 62 comprises such an item as PD (a distance between pupils for a far view), NPD (a distance between pupils for a near view), SEG (segment small lens position), EP (eye point) and FPD (a distance between geometric center points).

The spectacle frame information 63 comprises such a attaching hole data (as a hole position, a hole diameter and a hole depth) of a two point frame, such a groove data of a nyrol frame (as a groove width, a groove depth and a attaching position data), and such an unchangeable area (or changeable area) of the nyrol frame. Of course, the spectacle frame information 63 comprises a data required for a frame with a rim.

Then, in this embodiment, in addition to inputting the lens information from the operating portion 11b, the lens location information is also input. As described above, a known device as the location measuring device 12 may be used. On the other hand, the lens location information is not limited to be input from the location measuring device 12. Namely, when pre-calculated lens location information can be used in such a case that the same wearer is examined for previous measurement and this measurement, the data input receiving means 51 may obtain information from the recording device on the ordering side device 11 or the data server 4 on the communication line 3 through the information obtaining means 52. Note that the lens location information may be used without changing itself and a value of the lens location information may be corrected somehow, and then may be used.

The information obtaining means 52 accesses the data server 4 through the communication line 3, to thereby obtain the spectacle lens information 64 from the data server 4.

The spectacle lens information 64 indicates information other than information required for identifying the spectacle lens desired by the wearer, being other information required for the simulation.

The control means 53 is a transfer point of a data to be communicated in the ordering side 11. Specifically, the control means 53 has functions for communicating information received by the data input receiving means 51 to the received order processing means 56. Further, after that the simulation image receiving means 57 receives the simulation image of the scaling of the eye image generated in the simulation center 2, the control means 53 plays a role of communicating the simulation image to the displaying portion 11c. Furthermore, when the scaling of the eye image is out of an acceptable range for the wearer, the control means 53 plays a role of communicating a data corrected by the data correcting means 55 to the received order processing means 56 again.

The data correcting means 55 is for appropriately correcting a data about lens information in such a case that the scaling of the eye image is out of the acceptable range for the wearer. Note that, when the data correcting means 55 receives change of the data, lens information identified by data contents after changing, is obtained from the information obtaining means 52. And, the obtained information is input to the data input receiving means 51, and then the information is communicated to the simulation center 2 again by the received order processing means 56 through the control means 53.

When an order content of the simulation is confirmed, the received order processing means 56 communicates the order content, namely "lens information (lens designated information 61, layout information 62, spectacle frame information 63 and spectacle lens information 64 etc)" and "lens location information" to the order-receiving side device 21 through the communication line 3, to thereby order the simulation. Note that, in a simulation ordering of the spectacle lens (simply called "ordering" thereafter), when the data correcting means 55 corrects the data content, the received order processing means 56 performs to make an order to the order-receiving side device 21 in a situation with the deformation or correction reflected.

Although described in detail below, the simulation image receiving means 57 is for receiving the simulation image generated in the simulation center 2. And the simulation image receiving means 57 transmits the simulation image to the displaying portion 11c through the control means 53.

The data recording means 58 is for recording and saving an order content of the received order processing means 56 as an ordered data 65 with relation to such an identifying data as the wearer making an order, order process and ordered spectacle lens, as necessary. The ordered data 65 recorded and saved, comprises a data about the lens information and the lens location information.

3. Functional Constitution Example of the Order-Receiving Side Device

Next, a functional constitution of the order-receiving side device 21 in the simulation system for wearing spectacles will be described.

Figure 3:
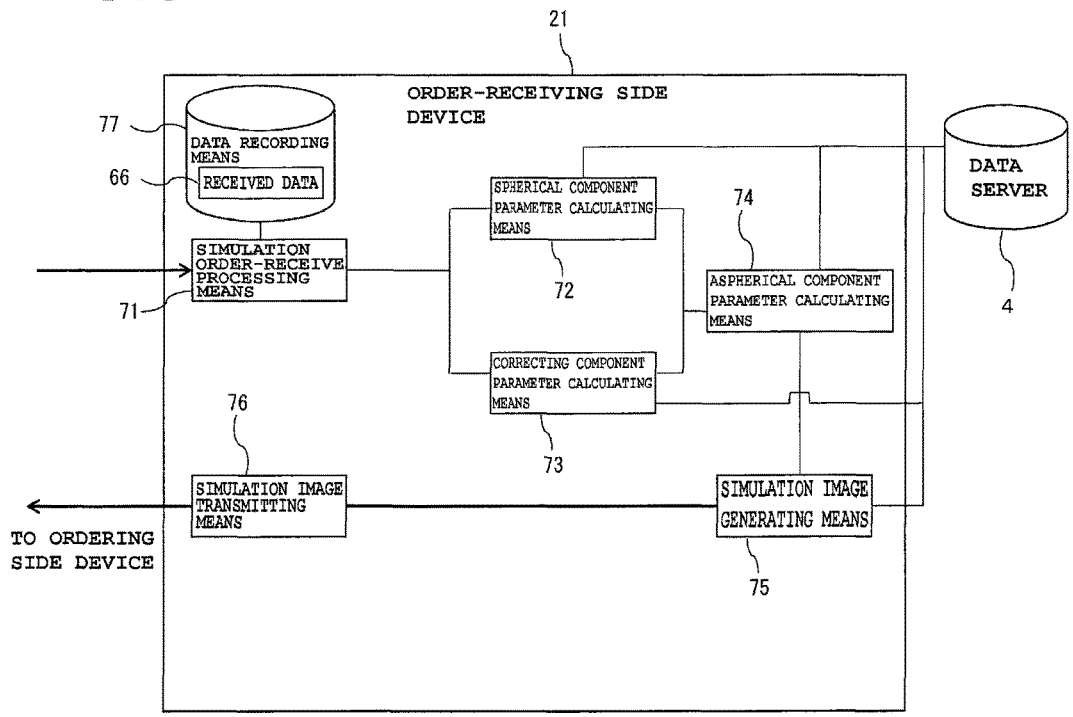
FIG. 3 is a block view, showing a functional constitution example of an order-receiving side device in the simulation system for wearing spectacles of this embodiment.

FIG. 3 is a block view, showing a functional constitution example of a order-receiving side device 21 in the simulation system for wearing spectacles. As shown in the figure, the computer portion 11a of the order-receiving side device 21 is constituted so as to serve as a simulation received order processing means 71, a spherical component parameter calculating means 72, a correcting component parameter calculating means 73, an aspherical component parameter calculating means 74, a simulation image generating means 75 and a simulation image transmitting means 76.

A received simulation received order processing means 71 (simply called "received order processing means 71" hereafter) is for receiving the simulation by making the order-receiving side device 21 receive a content of the order-received simulation after being fixed through the communication line 3, when contents of the order-received simulation are fixed. Note that the contents of the order-received simulation indicates "lens information" and "lens location information", and the "lens information" indicates such information as the lens designated information 61, the layout information 62, the spectacle frame information 63 and the spectacle lens information 64.

A) Mechanism of the Simulation

As described below, first, a mechanism of the simulation in this embodiment will be described in detail. Thereafter, each means for realizing the simulation will be described.

First, in this embodiment, one of the characteristics is utilizing a data of "lens location information" transmitted from the ordering side device 11 for calculating the correcting component parameter. It is comparatively easy for the wearer to obtain the spherical component parameter of the spectacle lens to be simulated. And, even if there is not a detail surface shape data of the lens optical surface with such a complex shape as that of the aspherical lens, when the correcting component parameter is obtained, it is possible to generate the simulation image by the simulation image generating means 75, without a basis of the surface shape data of the spectacle lens. Further, in order to calculate the correcting component parameter, the lens location information is used in this embodiment.

In this embodiment, one of the characteristics is shown as below. Based on information received in the received order processing means 71 (particularly lens location information), the spherical component parameter is calculated by the spherical component parameter calculating means 72, and the correcting component parameter is calculated by the correcting component parameter calculating means 73. And, based on the spherical component parameter and the correcting component parameter, the aspherical component parameter is calculated by the aspherical component parameter calculating means 74. And, based on the aspherical component parameter, the simulation image of the scaling of the eye image is generated by the simulation image generating means 75. Therefore, regarding at least the scaling of the eye image, a precise simulation can be carried out, as a detailed data of the optical surface shape of the spectacle lens to be simulated regarding the simulation of the scaling of the eye image of the wearer.

As described below, a way to generate the simulation image of the scaling of the eye image from the spherical component parameter and the correcting component parameter, will be described in detail by using FIG. 5 and FIG. 6.

Figure 5:
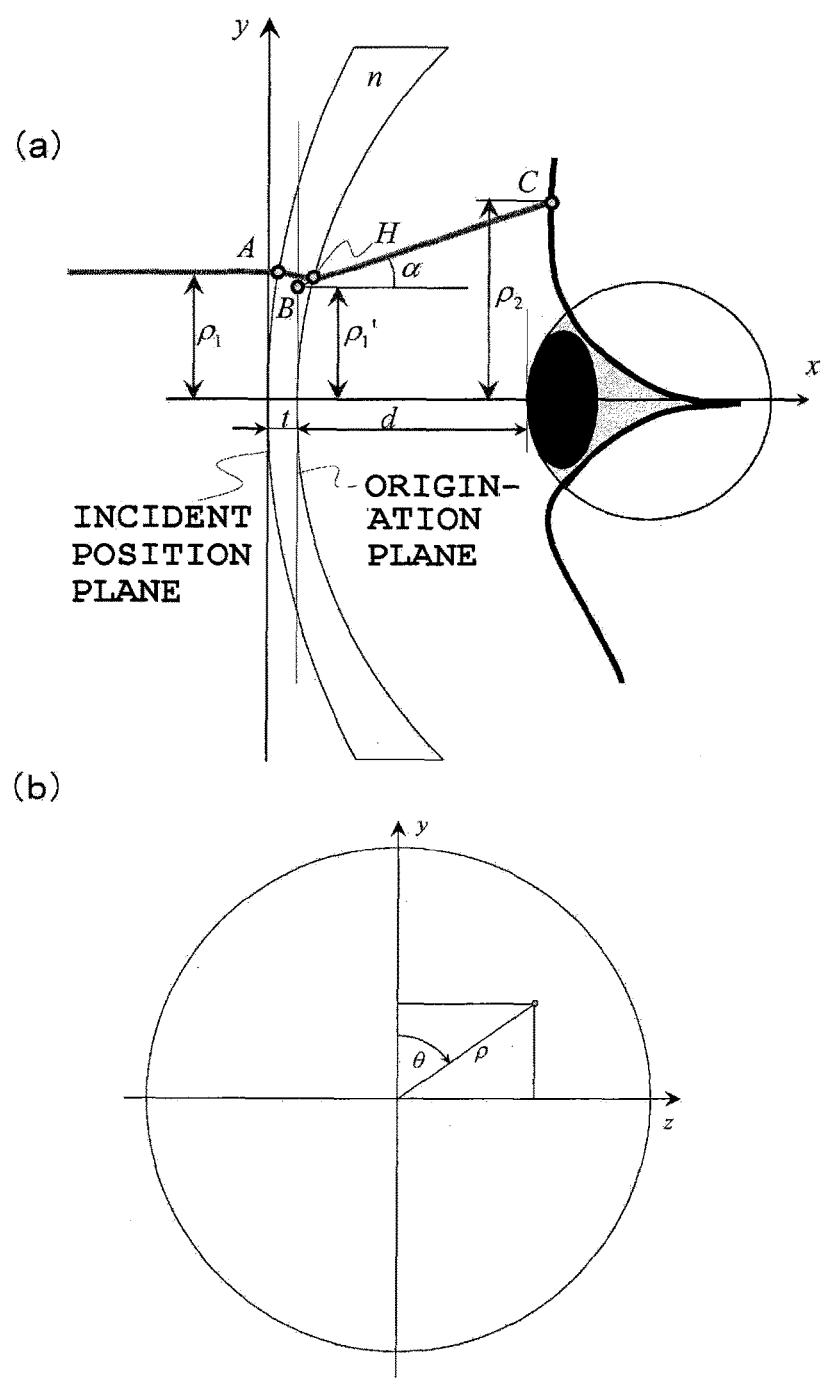
FIG. 5 is a schematic view for explaining the spherical component parameter and the correcting component parameter of this embodiment, particularly for explaining the correcting component parameter ("origination information correcting value" and "gradient information correcting value") by using the ray trace when light passes through the spectacle lens. (a) is a X-Y plane view (cross-section view of the spectacle lens), and (b) is a Y-Z plane view (plane view of the spectacle lens).

FIG. 5 is a schematic view for explaining the spherical component parameter and the correcting component parameter of this embodiment, particularly for explaining the correcting component parameter ("origination information correcting value" and "gradient information correcting value") by using the ray trace when light passes through the spectacle lens. Note that, an optical axis direction of the spectacle lens is set as X axis, a vertical direction being perpendicular to X axis is set as Y axis, and a horizontal direction being perpendicular to X axis is set as Z axis. Note that, X axis in this embodiment is in a horizontal direction and passes through a center of a pupil. FIG. 5(*a*) is an X-Y plane view (cross-section view of the spectacle lens), and FIG. 5(*b*) is a Y-Z plane view (plane view of the spectacle lens). Note that FIG. 5(*a*) shows a case of the spectacle lens (with refractive index n and a thickness at the geometric center t) using the spherical lens with the aspherical surface on both the front surface and the back surface. However, in this description, the spectacle lens in this drawing shows a shape similar to a spherical surface. In this case, curvature at each of the spherical shape parts indicate $r_1$ and $r_2$.

Figure 6:
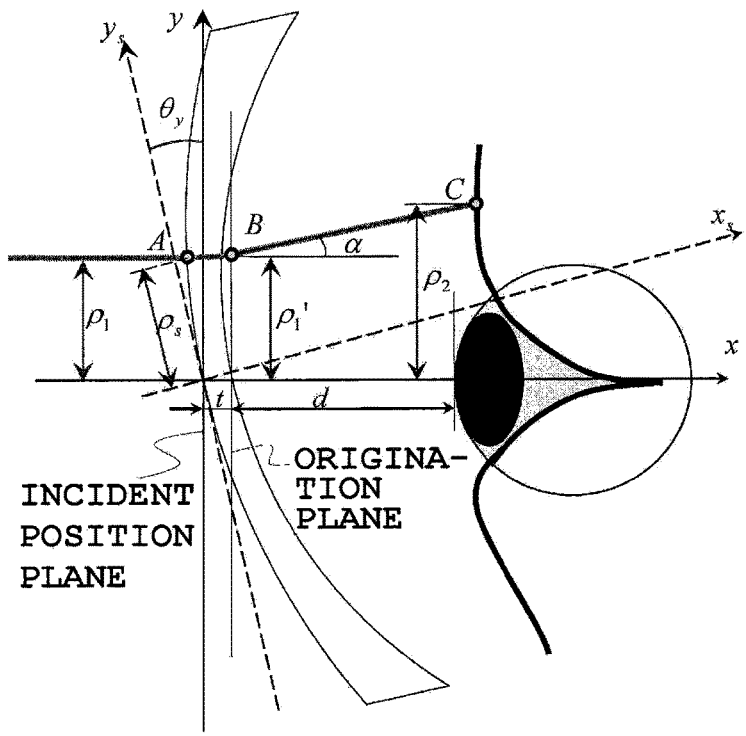
FIG. 6 is a schematic view for explaining the spherical component parameter and the correcting component parameter of this embodiment, particularly for explaining the situation with the spectacle lens tilted forward (a) or tilted inside (b). (a) is a X-Y plane view (cross-section view of the spectacle lens), and (b) is a X-Z plane view (cross-section view of the spectacle lens).
Figure 6:
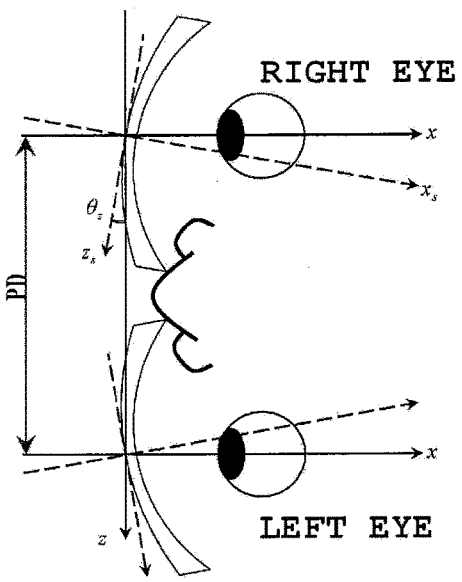

Further, FIG. 6 is a schematic view for explaining the spherical component parameter and the correcting component parameter of this embodiment, particularly for explaining the situation with the spectacle lens tilted forward (a) or tilted inside (b). (a) is a X-Y plane view (cross-section view of the spectacle lens), and (b) is a X-Z plane view (cross-section view of the spectacle lens).

In FIG. 5(*a*), in a view of incident light to the spectacle lens (a direction of light is also in X axis direction and direction of the lens thickness), incident light from a point A on the spectacle lens front surface is refracted in the spectacle lens and then proceed. After that, light is exited from a point H on the spectacle lens back surface outside the spectacle lens. Thereafter, light contacts a point C on the wearer face.

In a case of the aspherical lens like this embodiment, under ordinary circumstances, when the detailed optical surface data is obtained already, a trace of light at each part of the spectacle lens can be obtained by such a way as the ray trace. However, as described in the object of the invention, various optical surface shapes are determined according to wearer prescription. Nevertheless, due to wasting a lot of time for the ray trace to the aspherical surface and requiring to secure technical information of designing the aspherical surface, calculation information of scaling of the eye image by the spectacle lens is not carried out by only the ray trace method. Thus, in a situation that the wearer wears the spectacle lens, being aspherical lens, the simulation of the scaling of the eye image is not even examined. To solve the problem, the inventors conceived a specified means as described below.

First, the scaling of the eye image can be obtained, provided that a distance $\rho_1$ between the point A on which light is incident to the spectacle lens and a standard position (for example X axis, hereinafter), and a distance $\rho_2$ between a part on which light contacts on the wearer's face after light is exiting from the spectacle lens and the standard position, are known. Then, in order to calculate the $\rho_2$, it is required to examine, how light is refracted in the spectacle lens, namely how an actual exiting origination H of light from the back surface (in some cases, a point B, being imaginary exiting origination as described after in detail) is displaced from an actual incident origination A of light from the front surface of the spectacle lens ("origination information"), and which direction light is exited from the back surface of the spectacle lens ("gradient information").

Note that, as the "origination information", for example, coordinates of the actual incident origination A, the actual exiting origination H and the imaginary exiting origination B, can be given. In summary, "origination information" indicates information, being a basis of calculating a displacement from a position with light incident to the spectacle lens to a position with light exited from the spectacle lens, in a plane view vertical to an optical axis of light incident to the spectacle lens.

Further, "gradient information" indicates a tilt of ray when light exits from the spectacle lens, in an optical axis direction with light incident to the spectacle lens.

The scaling of the eye image is determined by a ratio of $\rho_1$ and $\rho_2$ (for example $\rho_2/\rho_1$). $\rho_1$ is a distance between the point A on which light is incident to the spectacle lens and X axis being the standard position in a plane view vertical to an optical axis of light incident to the spectacle lens, and $\rho_2$ is a distance between a point C being a part on which light contacts on the wearer face and a standard position. Provided that $\rho_1$ has no relation with the spectacle lens shape, the final scaling of the eye image depends on $\rho_2$. Then, a value of $\rho_2$ can be theoretically calculated by searching a displacement of the point C being a part on which light contacts on the wearer face from the point H, utilizing such information that how light is refracted in the spectacle lens, namely how much the exiting origination H from the back surface is displaced from the point A ("origination information"), and which direction light is exited from the back surface of the spectacle lens ("gradient information"), and how long distance between the back surface and the wearer is ("lens location information").

Thus, "origination information" exists in order to obtain $\rho_1$ required for calculating $\rho_2$ in FIG. 5(*a*) and a distance $\rho_1'$ (described as below) between the imaginary point B on which light exits from the spectacle lens and the standard position. As a specific example of the origination information, coordinates of the point A, the point B and the point H can be given.

Then, "gradient information" exists in order to calculate a displacement of light from $\rho_1'$ (a displacement in Y axis direction in FIG. 5(a)) by combination of "lens location information (for example, a distance d)" to thereby obtain $\rho_2$. As a specific example of the gradient information, a tilt of light k (angle α) from a view of X axis can be given.

As described above, it is also one of characteristics of this embodiment that the origination information is used for generating the simulation image. Furthermore, the inventors conceive that the "origination information" and "gradient information" are caused by at least two parameters of "spherical component parameter" and "correcting component parameter".

Provided that the spectacle lens is a spherical lens, "origination information" and "gradient information" are determined according to only "spherical component parameter". However, as described in the object of this invention already, in a situation that the spectacle lens is not completely spherical lens, "origination information" and "gradient information" do not depend on only "spherical component parameter". Specifically, the coordinates of the point B or the point H in a situation that the spectacle lens is not completely spherical lens, are displaced from the coordinates in a situation that the spectacle lens is completely spherical lens. Therefore, a position of the point C is displaced and $\rho_2$ is also displaced. Thus, the inventors conceived that there is some parameter (namely "correcting component parameter") for correcting "spherical component parameter". More specifically, the inventors conceived a method of calculating "origination information after correction" by combination "origination information" according to the spherical component parameter with "origination information correcting value" according to the correcting component parameter (for example, both are added together). In a similar way, the inventors found a method of calculating final "gradient information after correction", being a basis of the scaling of the eye image, by combination "gradient information" according to the spherical component parameter with "gradient information correcting value" according to the correcting component parameter. Therefore, the inventors conceived that, by "origination information after correction", "gradient information after correction" and "actual positioning relation (namely lens location information, for example distance d)", final $\rho_2$ based on the scaling of the eye image can be calculated on such an accuracy that the simulation of the scaling of the eye image can be precisely performed without the aspherical shape data in detail.

Thus, "aspherical component parameter" comprises "origination information after correction" and "gradient information after correction".

Note that "spherical component parameter" comprises "origination information" and "gradient information". And, these "origination information" and "gradient information" are caused by the spherical element of the spectacle lens. This "spherical element" indicates at least one of predetermined spherical power and astigmatism in a lens formed by spherical surface or toric surface. As one example is given, there are a spherical surface shape, spherical power and astigmatism etc. In addition, it is preferable to generate the simulation image based on a prism power. This is because, in the simulation image generating means 75, in addition to scaling of the eye image caused in a situation of wearing the spectacle lens by the wearer, movement of the eye image within the spectacle lens frame can be reflected, to thereby make it possible to make the wearer get the scaling of the eye image simulated experience with reality.

Meanwhile, "correcting component parameter" comprises "origination information correcting value" and "gradient information correcting value". And, these "origination information correcting value" and "gradient information correcting value" are caused by the aspherical element of the spectacle lens. This "aspherical element" indicates a component excluding the spherical element. Furthermore, "aspherical element" indicates an element being basis of a correcting value added to the spherical surface. In other words, aspherical element indicates an element of the spherical lens for realizing the spherical power and astigmatism in the aspherical lens. The element also indicates an element for realizing the spherical power and astigmatism in the aspherical lens. As one example is given, there is an aspherical surface shape, namely deformation (displacement from the spherical surface shape) and addition distribution etc.

Therefore, "aspherical component parameter" indicates a final parameter capable of performing the simulation of the scaling of the eye image precisely without the detailed data of a final aspherical surface shape, for the spectacle lens with the aspherical surface targeted for the simulation. Of course, aspherical component parameter does not have to be finally obtained parameter, and when performing the simulation, the aspherical component parameter may be slightly adjusted. Further, although it does not have to be described, the aspherical component parameter in this embodiment is based on the origination information and the gradient information.

Then, in the aspherical component parameter calculating means 74, origination information after correction and gradient information after correction are calculated as the aspherical component parameter, based on origination information and gradient information, and origination information correcting value and gradient information correcting value Although the effects of this embodiment will be described later, one of the effects is given as follow. The effect is that, when the spectacle shop 1 transmits such information as spherical power, astigmatism, addition and lens location information to the simulation center 2 and then orders the simulation to the simulation center 2, the simulation center 2 may just calculate the correcting component parameter based on their information. The spherical component parameter (namely, "origination information" and "gradient information") caused by the spherical lens, can be obtained easily by a known art when a curve value of the spectacle lens is known. Therefore, of course, the spectacle lens being simulation target of the wearer is not required to be manufactured actually, and the simulation of the scaling of the eye image can be precisely performed without the shape data of the optical surface in detail.

Thereafter, a specific method for calculating "aspherical component parameter" ("origination information after correction" and "gradient information after correction") from "spherical component parameter" ("origination information" and "gradient information") and "correcting component parameter" ("origination information correcting value" and "gradient information correcting value"), will be described. In that time, in a viewpoint of convenience for description, the above will be described in a situation that "origination information" is "origination coordinate". Note that, as necessary, a coefficient may be multiplied to the origination information and other treatment may be performed.

Note that, because of carrying out the simulation of the scaling of the eye image, the point C is at least a part of portions structuring the eye shape of the wearer in time of wearing the spectacle lens. Further, "portions structuring the eye shape of the wearer" may comprise the eyeball itself and portions around the eyeball (for example eyelid or an edge of the eye). Therefore, the portions may be portions structuring the eye shape when an observer looks at the wearer wearing the spectacle lens.

Moreover, as described using FIG. 5(a), provided that the point C exists in the vicinity of a border between the eyeball and the eyelid, and provided that in X direction the light exiting point H from the back surface of the spectacle lens is far from the point C than imagined, there is a possibility that an error occurs as compared to the actual $\rho_2$. Furthermore, when the point C on which light is actually radiated to the wearer, becomes closer to the back surface of the spectacle lens by a thick eyelid, there is also a possibility that an error occurs as compared to the actual $\rho_2$. However, in the present invention, the scaling of the eye image may be just simulated. Thus, such a greatly exact data as the spectacle lens prescription is not required, and the simulation may be precisely carried out, so that the observer does not have a strange impression for the wearer's outlook and the wearer does not feel uncomfortable, when the observer looks at the wearer. Therefore, the said error does not disturb the effect of the present invention (namely, precise simulation in time of wearing the spectacle lens using the aspherical lens). Rather, it is also an useful characteristics that the error can be accepted in this embodiment.

Note that, under ordinary circumstances, it is preferable to calculate an exact origination coordinate and then obtain an exact $\rho_1$ and $\rho_2$. However, as the following method is used, the effect of this embodiment can be exhibited without calculating the exact origination coordinate. This method will be described using FIG. 5(a).

Note that, in this embodiment, instead of measuring an actual distance between the point C and the point H in X-axis direction on each point of the spectacle lens back surface, the distance d between the imaginary exiting origination B and the point C on the face in X-axis direction is calculated by the following method.

The method is described as below. First, "incident position plane", being a contact plane (YZ plane) in contact with a geometric center of the front surface of the spectacle lens, is imaged. At the same time, "origination plane", being a contact plane (YZ plane) in contact with a geometric center of the back surface of the spectacle lens, is imagined. This "origination plane" is away from the "incident position plane" with a distance being the spectacle lens thickness a. Then, a cross point with light incident to the spectacle lens and the front surface of the spectacle lens is set as the point A. Thereafter, the light is exited from the point FT of the back surface of the spectacle lens, and then the light is radiated to the point C being a part of the wearer face. In that time, a cross point with an extended line of the line connecting the point H and the point C, and the origination plane, is set as the point B. In that time, as the distance d, a distance between the origination plane and the top of the wearer's eyeball is used. Thus, provided that, in a situation of wearing the spectacle lens, a part of constituting the eye shape of the wearer includes a top of the wearer's eyeball and exists in a plane parallel to the origination plane, the scaling of the eye image is simulated. And, instead of the point H on which light is exited actually from the back surface of the spectacle lens, a distance $\rho_1'$ (namely one of the origination information) between the point B that light is imagined to be exited from the spectacle lens and the standard position, is calculated based on coordinates of the point B. Note that, instead of the point A on which light is actually incident to the spectacle lens, a contact point with the incident position plane and light may be used as an imaginary incident origination.

As follow, a method for calculating the aspherical component parameter will be described specifically using a formula.

Although a conclusion is described first, using the simulation image generation means 75, a distance $\rho_2$ between a part on which light is incident to the wearer and the standard position, is calculated by some formulas as described below, in a view of a plane vertical to an optical axis direction of light incident to the spectacle lens, and then based on the $\rho_2$, the simulation image with the scaling of the eye image reflected, is generated.

The scaling of the eye image is determined by a positional relation with the point A(y, z) with light incident to the front surface, and the point $C(y_2, z_2)$ on the wearer's face with light reached, in a view of a plane vertical to the optical axis direction with light incident to the spectacle lens. What the observer sees on the point A, is actually what is on the point C on the wearer's face. Eye scaling power on this position means a proportion of a distance from the optical axis (standard position), namely $\rho_2/\rho_1$. Generally, on a different part on the lens, the eye scaling power is different from each other, therefore strictly, it may be considered that the eye scaling caused by the spectacle lens is determined by a distribution to coordinates (incident position) of the position C with light reached on the face. This distribution is described by a formula as the following formula (a):

[Formula 1]

$$y_2 = y_2(y, z)$$

$$z_2 = z_2(y, z) \quad (a)$$

Further specifically, the distribution is described as the following formula (b)

[Formula 2]

$$y_2 = y_2(y,z) = y_1'(y,z) + k_y(y,z)d$$

$$z_2 = z_2(y,z) = z_1'(y,z) + k_z(y,z)d \quad (b)$$

The formula $y_1'$, $z_1'$ (namely coordinates $y_1'(y, z)$, $z_1'(y, z)$, thereafter, when coordinates are indicated, sometimes a similar method like above is used) is coordinates of exiting light origination B, being origination information of exiting light. $k_y$ and $k_z$ are gradient information after exiting light incident to the spectacle lens from the sample point (y, of the front surface of the spectacle lens, from the back surface outside the spectacle lens. $k_y$ is gradient information in y direction of exiting light. $k_z$ is gradient information in z direction of exiting light. Although d is a distance from the point C to the origination plane, when a convex and a concave on the face is not taken into account, d can be considered as a distance from a top of the cornea to the lens back surface standard point (namely distance d between tops).

In this way, the scaling of the eye image by the spectacle lens can be calculated by the aspherical component parameter constituted by the origination information $y_1'(y, z)$ and $z_1'(y, z)$, and gradient information $k_y(y, z)$ and $k_z(y, z)$, and the lens location information in front of the eye including the distance between the tops d from the lens back surface standard point to the top of the cornea. The lens location information in front of the eye has the tilted forward angle or the tilted inside angle as an example. They are described thereafter.

When the spherical lens is changed to the aspherical lens in order to correct astigmatism, the origination information and the gradient information, being the scaling of the eye image parameter, are also corrected. Thus, the image scaling parameter can be taken into consideration, so that the image scaling parameter is separated to the spherical component parameter being constant and capable of calculating by such a simple and speedy method as a ray trace, and the correcting component parameter changed by asphericalizing.

First, "origination information" of "spherical component parameter" and "correcting component parameter" is described. While a center of thickness and prism on the spectacle lens is maintained, the said ($y_1'$, $z_1'$) is separated to origination information ($y_{1s}'$, $z_{1s}'$) of the spherical component parameter calculated in the spherical lens constituted by using a spherical or toric surface at a representative curvature of the front surface and the back surface, and origination information correcting value ($\Delta y_1'$, $\Delta z_1'$) of the correcting component parameter caused by using an aspherical surface, and then obtained separately as shown in the following formula (c).

[Formula 3]

$$y_1'(y,z) = y_{1s}'(y,z) + \Delta y_1'(y,z),$$

$$z_1'(y,z) = z_{1s}'(y,z) + \Delta z_1'(y,z) \quad (c)$$

Similarly, while a center of thickness and prism on the spectacle lens is maintained, $k_y$ and $k_z$ are separated to gradient information $k_{ys}$ and $k_{zs}$ of the spherical component parameter calculated in the spherical lens constituted by using a spherical or toric surface at a representative curvature of the front surface and the back surface, and gradient information correcting value $\Delta k_y$ and $\Delta k_z$ of the correcting component parameter caused by using an aspherical surface, and then obtained separately as shown in the following formula (d).

[Formula 4]

$$k_y(y,z) = k_{ys}(y,z) + \Delta k_y(y,z)$$

$$k_z(y,z) = k_{zs}(y,z) + \Delta k_z(y,z) \quad (d)$$

To summarize above once, the spherical component parameter $y_{1s}'(y, z)$, $z_{1s}'(y, z)$, $k_{ys}(y, z)$ and $k_{zs}(y, z)$ are origination information and gradient information calculated in the spherical lens constituted by using a spherical or toric surface at a representative curvature of the front surface and the back surface of the aspherical spectacle lens so that the center of thickness and prism are realized. And, $\Delta y_1'(y, z)$, $\Delta z_1'(y, z)$, $\Delta k_y(y, z)$ and $\Delta k_z(y, z)$ are correcting value for origination information and gradient information caused by being aspherical.

The above $\Delta y_1'$, $\Delta z_1'$, $\Delta k_y$ and $\Delta k_z$ are obtained by the following formula (e) being spline interpolation function, by determining a sample point (y, z) on the optical surface of the spectacle lens,

[Formula 5]

$$f(y, z) = \sum_i \left( \sum_j C_{ij} B_j(z) \right) B_i(y) \quad (e)$$

For example, the above formula may be obtained by making two dimensions B-spline about (y, z).

Note that f indicates $\Delta y_1'$, $\Delta z_1'$, $\Delta k_y$ and $\Delta k_z$ (namely any one of correcting component parameter), Bi(y) and Bj(z) indicate B-spline basic function in Y and Z axis direction, Cij indicates coefficient, thus all of the sample point values are determined so that their actual values and their interpolation values are same each other. When coefficient matrix Cij and a sample point numerical sequence are recorded, the origination information correcting value and gradient information correcting value in any points on the lens (y, z) can be calculated again.

Note that $\Delta y_1'$ and $\Delta z_1'$ are shown in the following formula (f).

[Formula 6]

$$\Delta y_1' = y_1' - y_{1s}', \Delta z_1' = z_1' - z_{1s}' \quad (f)$$

Meanwhile, $\Delta k_y$ and $\Delta k_z$ are shown in the following formula (g).

[Formula 7]

$$\Delta k_y = k_y - k_{ys}, \Delta k_z = k_z - k_{zs} \quad (g)$$

In this time, ($y_{1s}'$, $z_{1s}'$) is the origination information of the spherical component parameter calculated in the spherical lens constituted by using a spherical or toric surface at a representative curvature of the front surface and the back surface, while a center of thickness and prism on the spectacle lens is maintained.

And, $k_{ys}$ indicates gradient information in Y axis direction caused by the spherical lens constituted by the spherical surface or toric surface at a representative curvature, and $k_{zs}$ indicates gradient information in Z axis direction.

Further, $k_y$ indicates gradient information in aspherical Y axis direction caused by the aspherical lens, and $k_z$ indicates gradient information in aspherical Z axis direction.

"Correcting component parameter" of a convex aspherical surface or progressive surface (semi-lens) with a specific calculating method thereof, will be described as below.

First, a curvature of the back surface is determined so as to have a lens prescription assumed in time of designing this convex surface, then constituting the lens so as to have a predetermined convex surface and a predetermined thickness and prism power. In this lens, the aspherical component parameter constituted by origination information $y_1'(y, z)$ and $z_1'(y, z)$, and gradient information $k_y(y, z)$ and $k_z(y, z)$, with zero tilted-forward angle and zero tilted-inside angle, is calculated by skew ray trace. Next, the spherical lens is constituted by substituting this aspherical surface (or progressive surface) convex to a spherical surface with the representative curvature. In this spherical lens, origination information $y_{1s}'(y, z)$ and $z_{1s}'(y, z)$, and gradient information $k_{ys}(y, z)$ and $k_{zs}(y, z)$ of the spherical component parameter, is calculated by the skew ray trace.

The origination information correcting value $\Delta y_1'(y, z)$, $\Delta_1'(y, z)$, $\Delta k_y(y, z)$ and $\Delta k_z(y, z)$ of the correcting component parameter is calculated by subtracting the spherical component parameter from the aspherical component parameter.

The origination information correcting value can be obtained by using the following formula (h), derived by changing the formula (c) to the formula (f).

[Formula 8]

$$\Delta y_1'(y,z) = y_1'(y,z) - y_{1s}'(y,z)$$

$$\Delta z_1'(y,z) = z_1'(y,z) - z_{1s}'(y,z) \quad (h)$$

The gradient information correcting value can be obtained by the following formula (i), derived by changing the formula (d) to the formula (g).

[Formula 9]

$$\Delta k_y(y,z) = k_y(y,z) - k_{ys}(y,z)$$

$$\Delta k_z(y,z) = k_z(y,z) - k_{zs}(y,z) \quad \text{(i)}$$

As described above, for any incident position (y, z), the origination information correcting value and the gradient information correcting value of the correcting component parameter, can be calculated. However, all values for all points should not be saved. Thus, only for the limited number of sample points, the origination information correcting value and the gradient information correcting value are calculated and saved. Meanwhile, for points excluding the above limited number of sample points, a spline interpolating method for interpolating a value by using the close sample point value, being the above limited number of sample points, may be used.

For example, such a rectangle and net-shape cross point as y=−35, −30, −25, . . . 30, 35 mm, z=−35, −30, −25, . . . 30, 35 mm, is set as the sample points. Then, when a rectangle spline is obtained, a data can be organized to the abovementioned formula (e) (namely spline interpolating function).

Note that, in this embodiment, there is a reason why the origination information and the gradient information are separated into that of Y axis direction and that of Z axis direction. As described already, the object of the invention is to simulate the scaling of the eye image precisely. In the spectacle lens, there are many cases that astigmatism prescription and progressive function are added, and there are many cases of not having rotational symmetry around an optical axis. Provided that the spectacle lens has a spherical front surface and a spherical back surface, the lens can not be recognized as axis symmetry mathematically in a situation of having decentering and tilt. Therefore, incident optical ray and exiting optical ray do not necessarily exist on the same plane. When the scaling of the eye image is simulated, such an error that the wearer and the observer facing the wearer does not have uncomfortable feeling, can be accepted. Therefore, if taken in consideration of "a calculating amount capable of be simplified" and "precise of simulation result in some extent", as described above, it may be possible to separate the aspherical component parameter into that of Y axis direction and that of Z axis direction (on the contrary, that of X axis direction is not taken in consideration), then obtaining the spherical component parameter and the correcting component parameter.

Note that, as a method for adopting the sample points, as described above, "a cross point on matrix-like lattice (for example, (y, z))" may be set, then adopting a method of constituting two dimension rectangle range spline. Meanwhile, a cross point between a round-shape ring with an optical axis centered and radial lines may be set, then constituting two dimension spline in "round-shape range polar coordinates (for example (ρ, θ))". Thus, in a round-shape area capable of effectively covering an optically significant range, it is possible to calculate the correcting component parameter, and then calculate the aspherical component parameter. Finally, it is possible to perform the simulation of the scaling of the eye image in a round-shape area capable of effectively covering an optically significant range.

Specifically, as described in FIG. 5(b), the sample points may be placed on the polar coordinates (ρ, θ), then constituting two dimension B-spline based on the polar coordinate.

For example, such a cross point on a centrally net-shape-like radial line as ρ=0, 5, 10, . . . 30, 35 mm and θ=0, 5, 10, 15, . . . 350, 355, 360°, is set as the sample points, then calculating a polar coordinate spline, to thereby summarize as the following formula (j):

[Formula 10]

$$f(\rho, \theta) = \sum_i \left( \sum_j C_{ij} B_j(\theta) \right) B_i(\rho) \quad \text{(j)}$$

Here, f indicates any one of the correcting component parameter regarding ρ and θ. Bi (ρ) and Bj (θ) indicate B-spline base function in a radial direction and in an orientation angle direction, Cij indicates a coefficient, and values on all of the sample points are determined so that real calculating values are same as interpolating values. When coefficient matrix Cij and a sample point numerical sequence are recorded, the origination information correcting value and the gradient information correcting value can be re-calculated at any one of the points (ρ, θ) on the lens.

These data (a nodal point sequence and a coefficient of the two dimension B-spline) may be recorded in a data recording means 58, 77 etc. Thus, when the scaling of the eye image is calculated for the aspherical (or progressive) lens using this convex surface with any power, these data can be used for calculating the origination information correcting value and the gradient information correcting value.

Further, for all surfaces of the semi-lens, the node point sequence and a coefficient matrix of the two dimension B-spline for calculating the correcting component parameter, may be previously calculated and recorded as a data. Thus, even if a surface shape design data is not used, the scaling of the eye image can be precisely calculated for the aspherical (or progressive) lens with all power range.

Note that, although the above contents are described in a situation with light origination coordinate centered, of course, such other lens location information as the tilted forward angle or the tilted inside angle may be used for the simulation of the scaling of the eye image.

A situation with the tilted forward angle or the tilted inside angle taken into consideration of the simulation, will be described as follow.

According to a lens frame shape and a situation of fitting, a situation with the spectacle lens located forward-tilted (FIG. 6(a)) and a situation with the spectacle lens located inside-tilted (FIG. 6(b)), can be imagined.

In a situation of forward-tilted, a point A coordinate (local coordinate) on the spectacle lens convex surface with horizontal light on a incident light position (y, z) passed through, is not set as (y, z) but as ($y_s$, $z_s$) ($\rho_s$ shown as a distance from the standard position to the point A). In this case, the spherical component parameter is obtained by the skew ray trace, in a situation that the spherical lens with a nominal curve value of this lens is disposed to be tilted forward (tilted forward angle $\theta_y$) as described above. The correcting component parameter is obtained by a nodal point sequence coordinate value and a coefficient matrix of the two dimensions B-spline for obtaining the correcting component parameter of the aspherical surface (or the progressive surface) previously saved as described above. However, in that case, the correcting component parameter is required to be calculated not on the incident light position (y, z) but on the local coordinates ($y_s$, $z_s$). As this local coordinates ($y_s$, $z_s$), a local coordinate (FIG. 6(a)) at the point A with light, on the convex of the spherical lens, being obtained when the spherical component parameter is calculated, can be utilized.

Note that, in a situation of inside-tilted, like the forward-tilted situation, the spherical component parameter is obtained by the skew ray trace, in a situation that the spherical lens with a nominal curve value of this lens is disposed to be tilted inside (tilted inside angle $\theta_z$) as described above. The correcting component parameter is obtained by a nodal point sequence coordinate value and a coefficient matrix of the two dimensions B-spline for obtaining the correcting component parameter of the aspherical surface (or the progressive surface) previously saved as described above. However, in that case, the correcting component parameter is required to be calculated not on the incident light position (y, z) but on the local coordinates ($y_s$, $z_s$). As this local coordinates ($y_s$, $z_s$), a local coordinate (FIG. 6(b)) at the cross point A with light, on the convex of the spherical lens, being obtained when the spherical component parameter is calculated, can be utilized.

Of course, it is possible to obtain the origination information after correcting and the gradient information after correcting in consideration of both the above tilted forward angle and the above tilted inside angle, by applying the above method.

Note that, because the simulation of the scaling of the eye image is performed, the point C is at least a part of a portion constituting the eye shape of the wearer in time of wearing the spectacle lens. Further, "a portion constituting the eye shape of the wearer" may comprise the eyeball itself and surrounding area in the vicinity of the eyeball (for example, eyelid or an edge of the eyeball). In conclusion, it may be a portion structuring the eye shape, when the observer looks at the wearer with the spectacle lens.

In the above sample points, as a method of obtaining the origination information correcting value (for example how to make the origination coordinate move) and the gradient information correcting value of the aspherical component by the ray trace method, the following example can be given.

First, the spectacle lens with the aspherical component is chosen. If the simulation center 2 has information about the spectacle lens with the aspherical shape, the simulation center 2 may use the information. If the simulation center 2 does not have the information, the spectacle lens with the aspherical component is previously designed and stored on a database.

In addition, the spherical power (namely representative spherical power) and astigmatism and prism power, being a base in the spectacle lens with the aspherical component, are reflected, and then, a monofocal lens constituted by the spherical surface with the nominal curvature or toric surface of the lens with the aspherical component, is prepared.

And, the origination coordinate and gradient information of exiting light by horizontal incident light (light in the optical axis direction) passing through a designated sample point, is calculated for each lens (the aspherical lens and the spherical lens) by the skew ray trace. Then, difference between both (namely the origination information correcting value and the gradient information correcting value), and the origination information and the gradient information are combined, to thereby calculate the aspherical component parameter.

Note that, in the above situation, such a case that the simulation center 2 has the spectacle lens information with the aspherical surface shape is described. Namely, it is the following case. The spectacle shop 1 transmits the lens information etc to the simulation center 2, so the aspherical surface shape data (namely basic information of the aspherical component parameter), already obtained by the simulation center 2, is selected. Then, according to information transmitted from the spectacle shop 1, the spherical component parameter is calculated by the spherical component parameter calculating means 72. In some cases, the spherical component parameter exists already, so in such a case, the spherical component parameter is withdrawn from the data recording means 77 etc. Then, in addition to the "spherical component parameter", difference between the "aspherical component parameter" and the "spherical component parameter" (namely the "correcting component parameter") is calculated by the correcting component parameter calculating means 73. A set of the "spherical component parameter" and the "correcting component parameter" is transmitted to the aspherical component parameter calculating means 74. Thereafter, the "aspherical component parameter" is transmitted to the simulation image generating means 75. Thus, the simulation center 2 may transmit the "spherical component parameter" and the "correcting component parameter" (in such a case that the spectacle shop 1 has the spherical component parameter, only the correcting component parameter) to the aspherical component parameter calculating means 74.

Meanwhile, even in a case that the simulation center 2 does not have the spectacle lens information with the aspherical surface, it may be possible to perform the ray trace calculation in each case for the spectacle lens shape imagined, being a simulation target for the wearer, to thereby calculate the correcting component parameter. At the same time, it may be possible to obtain the spherical component parameter of the spectacle lens shape, to thereby calculate the aspherical component parameter. Therefore, even if the simulation center 2 does not have information of the spectacle lens with the aspherical shape, it is possible to calculate the aspherical component parameter. Furthermore, if a known correcting component parameter can be used for example in such a case of the same wearer, it is possible to calculate the aspherical component parameter.

Based on the above mechanism, in this embodiment, on a basis of information ("lens location information") received at the received order processing means 71, "origination information" and "gradient information", the spherical component parameter is calculated by the spherical component parameter calculating means 72. At the same time, the correcting component parameter is calculated by the correcting component parameter calculating means 73. Then, on a basis of the spherical component parameter and the correcting component parameter, the aspherical component parameter is calculated by the aspherical component parameter calculating means 74. Then, on a basis of the aspherical component parameter, the simulation image of the scaling of the eye image is generated by the simulation image generating means 75.

Each means will be described as follow.

B) Each Means for Specifically Realizing the Simulation

The spherical component parameter calculating means 72, as described above, is for calculating the spherical component parameter, in the spectacle lens targeted for simulation of the scaling of the eye image for the wearer.

Also, the correcting component parameter calculating means 73, as described above, is for calculating the correcting component parameter, being a factor of adding correction by the aspherical component to the spherical component parameter based on the spherical component, in some parameters based on the scaling of the eye image capable of being observed in time of wearing the spectacles with at least one of the optical surfaces aspherical.

Also, the aspherical component parameter calculating means 74, as described above, is for calculating the aspherical component parameter based on the spherical component parameter and the correcting component parameter.

The simulation image generating means 75 is, by the above mechanism, based on the aspherical component parameter, for generating the simulation image, which the scaling of the eye image capable of being observed in time of wearing the spectacles is reflected. Note that, as a technique itself for generating the simulation of the scaling of the eye image, a known technique may be used.

And, the simulation image transmitting means 76 is for transmitting the simulation image generated by the simulation image generating means 75 to the simulation image receiving means 57 in the spectacle shop 1.

Note that information calculated by the spherical component parameter calculating means 72, the correcting component parameter calculating means 73 and the aspherical component parameter calculating means 74, and the simulation image generated by the simulation image generating means 75, may be saved to the data server 4 (in some cases, the data recording means 77 hereinafter). Therefore, when the simulation is performed again for the same wearer, in a situation with the spherical component parameter unchanged, the aspherical component parameter may be calculated by withdrawing a data about the wearer from the data server 4 and inputting it to the aspherical component parameter calculating means 74.

Meanwhile, in a situation with the correcting component parameter unchanged, the aspherical component parameter may be calculated by withdrawing a data about the wearer from the data server 4 and inputting it to the aspherical component parameter calculating means 74.

Thus, by applying the abovementioned constitution, the ray trace calculation is not required for each simulation of the scaling of the eye image of the wearer. Further specifically, it is preferable that an addition distribution, being one of basis of the correcting component parameter, is previously withdrawn and stored on the data server 4 (in some cases, the data recording means 77).

Furthermore, other data may be arbitrarily transmitted from the data server 4 to the aspherical component parameter calculating means 74 or the simulation image generating means 75.

Note that, in a viewpoint that the correcting component parameter is caused by the addition distribution, the correcting component parameter is preferably obtained by using the ray trace method. However, unless there is such a known data as that of the same wearer, the above method is not limited to it.

4. Procedure of the Simulation

Next, procedure of the simulation in the simulation system for wearing spectacles with abovementioned constitution, will be described. Regarding a process not written specifically, a known system may be used.

Figure 4:
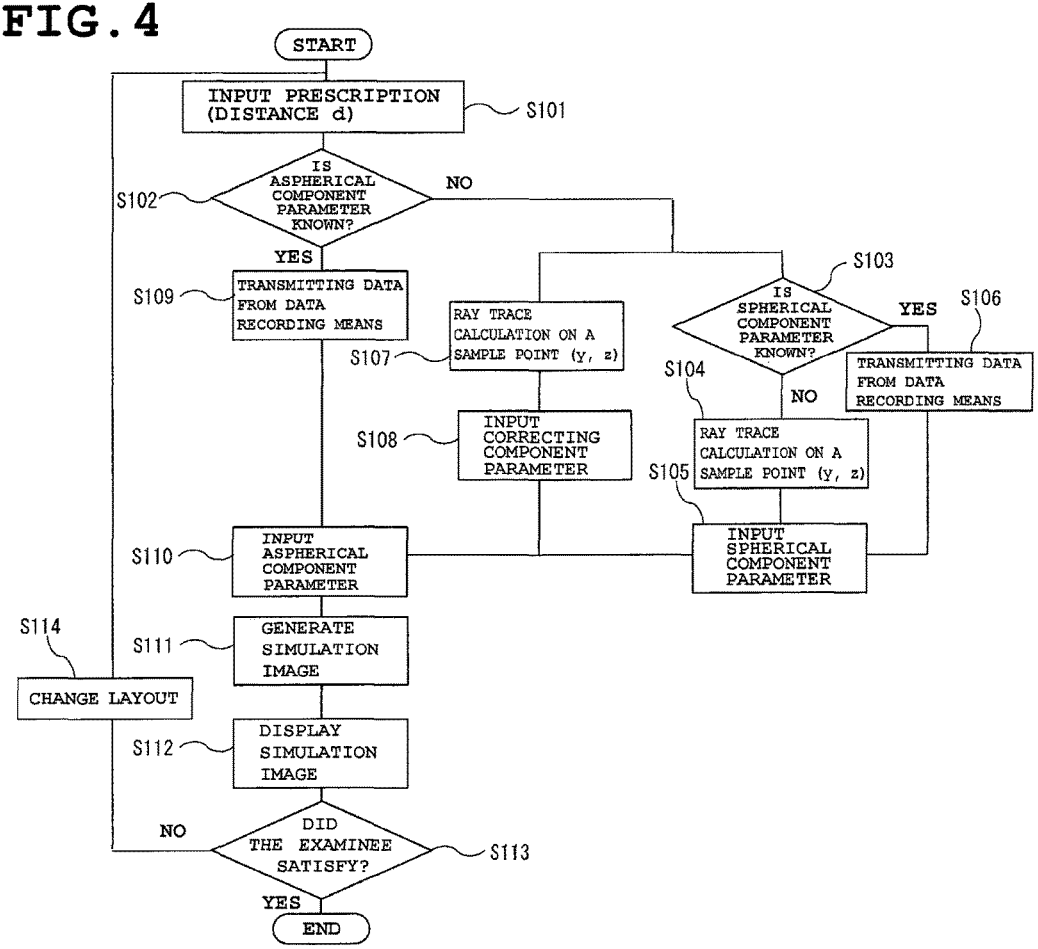
FIG. 4 is a flow chart, showing a schematic procedure of the simulation system for wearing spectacles of this embodiment.

FIG. 4 is a flow chart, showing a schematic procedure of the simulation system for wearing spectacles of this embodiment.

When the spectacle shop orders the scaling of the eye image simulation of the wearer to the simulation center 2, first, each information including the lens designation information 61 and the layout information 62 is input in the ordering-side device 11 of the spectacle shop 1 (step (called simply "S" hereinafter) 101). When these each information are input, in the computer portion 11a, the data input receiving means 51 receives each input information, and then at least the lens designation information 61 and the layout information 62 are temporarily saved by using such a recording device as RAM or HDD.

Further, in the spectacle shop 1, the shopper previously operates the location measuring device 12, and then the lens location information between at least a part of the portion constituting the eye shape of the wearer and an eyeball side surface of the spectacle lens, in time of wearing the spectacle lens, is measured. And, the result of the measurement is input from the location measuring device 12 to the computer portion 11a of the ordering side device 11. When the data is input from the location measuring device 12, in the computer portion 11a, the data input receiving means 51 receives the data, and then, like such a case as the lens designation information 61, the data is temporarily saved by using such a recording device as RAM or HDD. Note that, provided that the lens location information for the wearer can be obtained from such a recording device of the ordering side device 11 or a server device on the communication line 3, it can be considered that the data input receiving means 51 obtains the spectacle frame information 63 from parts with these data. Thus, in this case, measuring operation by the location measuring device 12 is not required.

And, the data input receiving means 51 receives the lens designation information 61, the layout information 62, the spectacle frame information 63 and "lens location information". Thereafter, these data are transmitted to the control means 53, and those data are transmitted to the order-receiving processing means 71 of the order-receiving side device 21 in the simulation center 2 through the ordering processing means 56.

Thereafter, while the order-receiving processing means 71 refers to the data recording means 77 (or the data server 4), the order-receiving processing means 71 of the order-receiving side device 21 determines whether each parameter to be obtained based on the transmitted data is calculated already, in addition, whether the wearer experienced the measuring already (S102).

If the aspherical component parameter is calculated already (namely, something corresponding to "origination information after correction" and "gradient information after correction" is already obtained) and the lens location information is also obtained, these data are withdrawn from the data recording means 77, and then these data are transmitted to the aspherical component parameter calculating means 74 (S109). Thereafter, these data themselves or the aspherical component parameter based on these data are calculated (S110). In some cases, the simulation image generation (S111) may be sequentially performed.

If the aspherical component parameter is not calculated yet, next, the receiving received order processing means 71 determines whether the spherical component parameter is calculated already (S103). As a result, if the spherical component parameter is calculated already, the spherical component parameter is transmitted to the spherical component parameter calculating means 72 (S106). Meanwhile, if the spherical component parameter is not calculated yet, the spherical component parameter is calculated in the spherical component parameter calculating means 72, by performing such a method as the ray trace, based on the data transmitted from the spectacle shop 1 (S104). Then, the result thereof is input to the aspherical component parameter calculating means 74 (S105).

At the same time, before or after determination whether the spherical component parameter is not calculated yet, if the correcting component parameter is not calculated yet, next, the receiving received order processing means 71 calculates the correcting component parameter by the correcting component parameter calculating means 73, by performing such a method as the ray trace, based on the data transmitted from the spectacle shop 1 (S107). Then, the result thereof is input to the aspherical component parameter calculating means 74 (S108).

Note that, although as not shown in FIG. 4, it may be determined whether the correcting component parameter is calculated. Further, as a result, if the correcting component parameter is calculated, the correcting component parameter may be transmitted to the aspherical component parameter calculating means 74.

Through the above steps, the aspherical component parameter is calculated (S110). Thereafter, based on the aspherical component parameter, the simulation image is generated by the simulation image is generating means 75 (S111). Then, the simulation image is displayed on the displaying portion 11c of the ordering side device 11 in the spectacle shop 1 (S112).

And then, the wearer is made to simulate experience the scaling of the eye image capable of being observed in time of wearing spectacles. The wearer is made to examine the result of simulating experience (S113). If the wearer satisfies, a series of the simulation is finished. If the wearer does not satisfy, the shopper of the spectacle shop 1 generates new lens information by using the data correcting means 55 from the operating portion 11b (S114). Therefore, a data based on the new generated information is transmitted to the simulation center 2 again, and S102 is proceeded again. And, until the wearer satisfies, this step is repeated.

5. Simulation Program

Note that, in the above each means, each means excluding the data recording means 58 in the ordering side device 11 and the data recording means 77 in the order-receiving side device 21, is realized by performing a determined program installed in such as HDD of the computer portion 11a by a CPU of the computer portion 11a.

Thus, the computer portion 11a of the ordering side device 11 and each means in the order-receiving side device 21 (namely, a simulation center 2 side computer portion (not shown)) can work by the simulation program for serving the computer portion 11a as each means, and in other words, by the simulation program, can also work as means for calculating the aspherical component parameter being a basis of the scaling of the eye image generated in a situation of wearing the spectacle lens, the simulation image generating means for generating the simulation image reflecting the aspherical component parameter, and the simulation image displaying means for displaying the simulation image. Of course, the data recording means 77 in the order-receiving side device 21 is similar to the above. In that case, the simulation program may be provided through the communication line 3, prior to be installed in such as a HDD of the computer portion 11a or the order-receiving side device 21 (namely ordering side computer portion), and may be provided by being installed to a recording medium capable of reading by such as the computer portion 11a.

Further, in spline interpolation calculation in a situation of determining the above sample point (y, z) or ($\rho$, $\theta$), the nodal point and the coefficient C in Y-axis and Z-axis, or the nodal point, and in a radius direction and an azimuthal direction, the coefficient C may be saved in a file.

Further, regarding the data recording means 58 in the ordering side device 11 and the data recording means 77 in the order-receiving side device 21 (also called "data recording means 58 etc" hereinafter), it is considered to be realized by using a part of a recording area in such as HDD of the computer portion 11a etc. However, the data recording means 58 etc are not necessarily included in the computer portion 11a etc in the ordering side device 11. Provided that the computer portion 11a etc comprise a communication means capable of accessing to the data recording means 58 etc (not shown), the data recording means 58 etc may be provided in a different device from the ordering side device 11 or the order-receiving side device 21 (for example, a part of the recording area in the data server 4). Furthermore, provided that there are the data recording means 58 included in the computer portion 11a etc and the data recording means in the different device capable of accessing through the communication means together, the computer portion 11a etc may have functions as a determining means for selecting a destination to save a data. In a case of the above description, like the above each means, the communicating means and the determining means are realized by performing a determined program at the computer portion 11a etc.

6. Method for Providing Simulation Information for Wearing Spectacles

As described above, this embodiment has characteristics as a simulation device and a method thereof, a simulation system, and a program working a computer for performing them. In addition, as described above, this embodiment also has characteristics as a method of providing simulation information. Thus, based on the aspherical component parameter in the spectacle lens identified by a user device, a simulation image reflected with the scaling of the eye images capable of being observed in time of wearing spectacles, or a data required to generate the simulation image, is transmitted from the server device to the user device. Then, the simulation image is displayed on the simulation image displaying means in the user device, to thereby provide the wearer with simulation experience of the eye image capable of being observed in time of wearing spectacles.

Note that generating the simulation image may be performed in the user device or the server device connected with the user device. In a situation of using the user device, the data is processed in the user device, the simulation image is generated and displayed in the user device.

Note that, in the above situation, in the parameters being a basis of the scaling of the eye image, the correcting component parameter, being a factor of correcting the spherical component parameter, based on the spherical component parameter due to the aspherical component, may be saved in the server device.

Further, the simulation image or the data required to generate the simulation image may be transmitted from the server device to the user device. In a situation with the data transmitted, the data is processed in the user device, the simulation image is generated and displayed in the user device.

7. Effect of this Embodiment

According to such as the simulation system for wearing spectacles etc described in this embodiment, even for an aspherical lens, at least scaling of the eye image can be precisely simulated.

In addition, the following two problems can be solved.

One is to make it possible to solve "increasing an amount of information". Thus, by calculating "aspherical component parameter" from "spherical component parameter" and "correcting component parameter", scaling of the eye image can be precisely simulated, without the complex aspherical lens surface data. Furthermore, as a method of precisely reappearing deformation of the image within the frame, for all pixels, a position (a position of a former image) that light ray passing through position on the frame crosses with the face (around the eye), had to be calculated by the skew ray trace. However, by performing those at the sample point, an amount of calculation for an aspherical surface by the ray trace can be decreased, and therefore an amount of time for calculation can be shortened.

Thus, the aspherical surface is simulated from the correcting component parameter correcting the spherical component parameter in addition to the spherical component parameter, thus simulating the scaling of the eye image. Therefore, it is possible to maintain simulation accuracy greatly precisely. Moreover, as a result, at least scaling of the eye image can be precisely simulated, without detail surface shape data of the actual aspherical lens.

Another one is to make it possible to reduce "a risk of leaking technical information". Even if the eye scaling calculation is performed by a PC in the spectacle shop or a server of an outsourcing network service company, something leaked is just "spherical component parameter" and/or "correcting component parameter". In other words, detail data of the aspherical lens shape itself is not leaked.

Note that, in this embodiment, the surface shape of the aspherical lens does not have to be reappeared, and the simulation of the scaling of the eye image may be precisely performed. Thus, one characteristics of this embodiment is that it becomes not necessary to use the surface shape data of the aspherical lens itself. Of course, although the surface shape data of the aspherical lens may be used somehow for the simulation, in view of a risk of leaking technical information as described above, it is considered that a situation without using the surface shape data has more merits.

Further, conventionally in a lot of monofocal aspherical lens or progressive lens, a lens with determined prescription of power and prism is realized by applying an aspherical surface or a progressive surface to a convex surface (the object side surface being the front surface), and a different curvature surface or a toric surface to an concave surface (the inside surface being the back surface). A specific convex aspherical surface or progressive surface in this case is used in common for a lens in some power range. Normally, a few kinds of the convex aspherical surface or the progressive surface (semi-lens) are prepared, and thereby to cover all power range for the monofocal aspherical lens or progressive lens. Therefore, according to this embodiment, provided that "correcting component parameter" caused by these limited kinds of the aspherical surface or the progressive surface are previously prepared, the simulation of the scaling of the eye image, even in a situation of an aspherical lens with complex surface shape, can be performed simply and precisely, when spherical component parameter of a spectacle lens worn by a wearer is obtained.

Therefore, it is possible to reduce a risk of leaking technical information and comparatively simply realize a precise simulation of the eye image capable of being observed in time of wearing spectacles with the aspherical shape and. As a result, the wearer can get a same appearance as the simulation result in time of wearing the spectacle lens. Further, the spectacle shop and the spectacle lens manufacturer can get sufficiency customer satisfaction.

8. Modified Example

Although this embodiment of this invention is described above, the above disclosure just shows embodiments as an example of this invention. Namely, a technical scope of this invention is not limited to the above embodiments as an example.

As the "lens location information" of this embodiment, as shown FIG. 5(a) or FIG. 6, a distance from a geometric center of the spectacle lens to a part of the wearer's eye in a X axis direction, is used as an example. It is true that more precise eye image simulation can be performed by using a distance in X direction from an incident point B on an origination plane to a part on which light is radiated to the wearer. In this case, convex and concave information around the eye is required to be figured out, but it is difficult. Meanwhile, accuracy for simulating the scaling of the eye image may be a precise level so that the wearer does not have uncomfortable feeling. Therefore, even if an actual distance from an incident point B to a cross point C to the wearer's face is not completely figured out, the scaling of the eye image can be simulated more precisely and more simply than that of a conventional art, by using "actual distance (particularly the distance between tops d)" from a part of a back surface (for example, the geometric center or an optical center) to the wearer.

Note that, it becomes possible to perform more precise simulation of the scaling of the eye image by using a distance from an exiting point H from a back surface, to a part of the wearer on which light is reached. Meanwhile, accuracy for simulating the scaling of the eye image may be a precise level so that the wearer does not have uncomfortable feeling. Therefore, even if an actual distance from an exiting point H to the wearer (a point C) is not completely figured out, the scaling of the eye image can be simulated more precisely and more simply than that of a conventional art, by using an actual distance from a part of a back surface (for example a geometric center or an optical center) to the wearer, tilted inside angles and tilted forward angles. Thus, "actual distance" of this embodiment means a distance for calculating "origination information after correction" (specifically "origination coordinate after correction", furthermore "origination information correcting value" caused by the correcting component parameter) by relation with "gradient information". If a distance finally calculates "aspherical component parameter" and is an actual distance between a back surface of a spectacle lens and a wearer, "actual distance" does not have to be a distance in X axis direction or distance between tops d.

Although described again, the "origination information after correction" may be calculated, in consideration of the "tilted forward angles (for example, in XY plane view, angles made by the spectacle lens and optical axis)" formed by the spectacle lens and (optical axis, being visual line axis) of the wearer and the "tilted inside angles (for example, in XZ plane view, angles made by the spectacle lens and optical axis)", in addition to "the actual distance".

Meanwhile, in this invention, regarding a spectacle lens, being an aspherical lens, "spherical component parameter" and "correcting component parameter" may be somehow separately obtained. Therefore, if these parameters can be obtained, "actual distance" does not have to be used. As a specific example is given, provided that the actual distance is set as a determined constant value, "spherical component parameter" and "correcting component parameter" may be separately obtained, thus obtaining "aspherical component parameter".

Further, even if the above "actual distance" itself is not used (namely actual distance in X direction is not used), an actual distance between at least a part of the portion constituting the eye shape of the wearer and a back surface of the spectacle lens may be reflected.

As described above, naturally, it is preferable to set "actual distance" of "lens location information" of this embodiment as a distance between tops d or an actual distance from a point H to a wearer. However, even if this distance is not calculated at each sample point of the said ray trace calculation, sufficiently precise simulation of the scaling of the eye image can be performed.

Further, "actual distance" may not be a distance in X axis direction, and for example, a distance in a direction with tilt in XY plane. Each parameter may be calculated from gradient information after correcting, and such a processing as suitably multiplying a coefficient to the distance may be performed.

As a result, in this invention, in the spectacle lens with the aspherical surface, it is characteristic that, of course besides "movement of the eye image within the spectacle lens frame" caused by prism power, especially, "scaling of the eye image" is precisely simulated from "spherical component parameter" and "correcting component parameter".

Meanwhile, instead of using "aspherical component parameter" being characteristics of this invention, using "actual distance" is also new technical thought. Therefore, as a means for solving the object of this invention, the below constitution is given.

A simulation system for wearing spectacles, providing wearer with simulated-experience of the eye image capable of being observed in time of wearing a spectacle lens, comprising, a simulation image displaying means of displaying a simulation image reflected with an scaling of the eye image capable of being observed in time of wearing the spectacle lens, based on an actual positioning relation between at least a part of a portion forming the wearer's eye shape and the eye side surface of the spectacle lens in time of wearing the spectacle lens.

Characteristics of the above modified example is that the precise simulation of the eye image capable of being observed in time of wearing the spectacle lens by using the "actual positioning relation" in time of wearing the spectacle lens, irrespective of the spectacle lens shape. In this case, even in the spherical lens, the object of this invention (namely "increasing the data") can be occurred, because of difference between the front surface shape and the back surface shape. Further, the surface shape in that case is also important technical information for the lens maker. Therefore, another object of this invention (namely "a risk of leaking information") can be occurred as ever. Then, by using the above modified method, it is possible to solve the above problem. Thus, the above modified example can be adapted to the spherical lens in addition to the aspherical lens.

Note that, in such a case that the simulation target is the spherical lens, if at least "spherical component parameter" is calculated previously, it is possible to simulate the scaling of the eye image precisely.

If the spectacle lens being the simulation target is the spherical lens, it is possible to simulate the scaling of the eye image precisely, by using the above modified example, sometimes without ray trace calculation. For example, in such a case that the spectacle lens is the spherical lens, the simulation image is generated based on the "spherical component parameter". This "spherical component parameter" can be calculated comparatively easily by a known calculating method, if a curve value (n−1)/r (n indicates refractive index and r indicates curvature) of the spectacle lens can be obtained. In addition, by using a method of [Embodiment 3] described after, it is possible to skip the ray trace calculation and calculate the spherical component parameter.

Further, as an example of "spherical component parameter", "correcting component parameter" and "aspherical component parameter", "origination information" and "gradient information" are given. Provided that the incident point A of the front surface of the spectacle lens, the imaginary exiting point B of the back surface and the point C with light reached on the face are known and each distance from a standard position (X axis in FIG. 5(a)) is known in Y axis direction and Z axis direction, something excluding "origination information" and "gradient information" may be applied.

Note that, origination coordinate of "origination information" indicates coordinate showing displacement, from a position on which light is incident to the spectacle lens to a position on which light exits from the spectacle lens, in a view of a surface "excluding" a plane vertical to the optical axis direction of which light is incident to the spectacle lens. In other words, origination information may be a parameter for obtaining the displacement. Thus, by applying calculating process to this displacement, instead of the origination coordinate, displacement (also called "origination shift") in a view of a plane vertical to the optical axis direction of which light is incident to the spectacle lens may be derived.

Further, similarly, also with respect to "gradient information", tilt of ray light exiting from the spectacle lens may be obtained at first, in a view "excluding" a view from the optical axis direction of which light is incident to the spectacle lens. And then, tilt of ray light exiting from the spectacle lens may be obtained in a view from the optical axis direction of which light is incident to the spectacle lens.

Note that, when the observer observes, not from a view in front of the wearer but from an oblique direction of the wearer, incident ray light is incident obliquely. In this case, similar to a case of tilted-forward or tilted-inside as shown in FIG. 6, it is necessary to calculate the correcting component parameter, not by using ray light incident position (y, z) but by using local coordinate of a passing point on a convex surface. Further, because a face plane is not vertical to the incident ray light, it becomes slightly complicated to obtain the cross point with the incident ray light and the face plane. However, the calculation is a content capable of being solved by using analytic geometry, and it becomes possible "to comparatively simply realizing a precise simulation of the eye image capable of being observed in time of wearing spectacles with the aspherical shape, being an object of this invention.

Further, when the distance d between the top of the spectacle lens back surface and the top of the wearer (for example a distance in a horizontal direction), being one of the lens location information, is measured in the spectacle lens shop 1, irrespective of whether the spectacle lens has suitable abilities for the wearer or not, a spectacle lens for simulation having an optical shape with the same distance d as a case of wearing a spectacle lens finally purchased, may be prepared at the spectacle lens shop. When the spectacle lens for simulation can not be prepared, "lens location information" in a case of wearing the spectacle lens may be previously determined and this distance d may be used for generating the simulation image thereafter.

Note that, although "simulation image" in this embodiment, it is mainly imagined that an image can be displayed on the displaying portion 11c, by projecting a three dimensional stereoscopic vision, the scaling of the eye image may be shown. Also, as described above, a plurality of the sample point (y, z) and parts on which light is irradiated on the wearer, may be prepared, and the simulation of the scaling of the eye image may be performed by using results of ray trace calculation on the plurality of the parts. Thus, it becomes possible to precisely reappear the scaling on each part of the eye image, as a result, accuracy of the simulation of the scaling of the eye image can be improved.

In this embodiment, as a method of obtaining "aspherical component parameter", a method that "correcting component parameter" is added to "spherical component parameter", is described. Meanwhile, provided that the aspherical component parameter can be obtained by reflecting with each other, other methods excluding simply adding may be adopted. As one example is given, processes that coefficient is multiplied to the spherical component parameter or correcting component parameter or other processes, may be adopted. In addition, in the first place, "aspherical component parameter" may be calculated by performing the ray trace calculation for the spectacle lens to be simulated, without separating "spherical component parameter" and "correcting component parameter". Specifically, $\rho_1$ and $\rho_2$ may be calculated, by performing the ray trace calculation for the spectacle lens to be simulated. When calculating, origination information reflecting the aspherical surface of the spectacle lens to be simulated ("origination information after correcting" and "gradient information after correcting" in this embodiment), may be calculated by the ray trace calculation, without separating spherical component parameter" and "correcting component parameter. Then, all of the above ray trace calculation may be performed in the receiving-order side device 21, and may be performed in the ordering side device 11 or the data server 4. Also, the order-receiving side device 21, the ordering side device 11 or the data server 4 may take charge of part of the above ray trace calculation.

In this embodiment, it is described as a example of providing "spherical component parameter calculating means 72", "correcting component parameter calculating means 73" and "aspherical component parameter calculating means 74" in the order-receiving side device 21. Meanwhile, the ordering side device 11 (for example the data recording means 58) or the data server 4 may be provided to either of those or combination of those. As one example is given, the correcting component parameter to be calculated by the correcting component parameter calculating means 73 are already installed as a data in the ordering side device 11 or the data server 4. In that case, when a predetermined data is input to the data input receiving means 51 of the ordering side device 11 by the operating portion 11b, the correcting component parameter already installed in the data recording means 58 or the data server 4 is withdrawn through the control means 53. Then, if necessary, the spherical component parameter is received from the simulation center 2 and the aspherical component parameter may be calculated by the control means 53. Reversely, the spherical component parameter may be already installed as a data in the ordering side device 11 or the data server 4. Further, both parameters may be already installed as a data in the ordering side device 11 or the data server 4. Data which may be already installed as a data in the ordering side device 11, order-receiving side device 21 or the data server 4, includes the origination information, the gradient information and the lens location information, in addition to these parameters.

Furthermore, similar to "spherical component parameter calculating means 72", "correcting component parameter calculating means 73" and "aspherical component parameter calculating means 74", "simulation image generating means 75" may be provided in the ordering side device 11 or the data server 4 etc. In conclusion, the above effects can be exhibited by the simulation system, the method, the device and the program having the simulation image displaying means (displaying portion 11c) displaying the simulation image generated based on the aspherical component parameter.

Further, as a method of providing a simulation information, it is considered that each time the simulation of the scaling of the eye image is performed, the correcting component parameter is calculated in the simulation center 2. Meanwhile, in a case in which the simulation center 2 has the detailed aspherical shape data as technical information, when an order from the spectacle shop 1 is received, the spectacle shop 1 may be provided with difference (namely, the correcting component parameter) between the spherical component parameter saved in the data server 4 and the aspherical component parameter introduced from the detailed aspherical shape data. Then, by combining the spherical component parameter and the correcting component parameter by the spectacle shop 1, the aspherical component parameter may be reappeared so as to be capable of simulation.

Embodiment 2

As one example of the embodiment 1, it is given that addition distribution being one of the correcting component parameter is drawn and is made to be a data, and is installed in the data server 4 (sometimes in the data recording means 77). Therefore, it is true that the simulation of the scaling of the eye image of the wearer can be precisely simulated without the detailed surface data of the spectacle lens. However, as described in the problem of this invention, recently, kinds of the spectacle lens are varied. That is similar to addition in the whole spectacle lens. For example, even if adopting the progressive lens having the same far-vision power and the same progressive band length, even in consideration of 0.25 D pitch, fourteen kinds of the spectacle lens exist in the spectacle lens with addition from 0.75 D to 3.50 D. In addition, these addition distributions are different from each other corresponding to each addition. Therefore, if the correcting component parameters (spline data distributed on the lens, of the origination information correcting value and the gradient information correcting value) have to be prepared, an amount of the data becomes increased greatly. Furthermore, as the problem of the invention, "great increase of the shape data on the optical surface of the spectacle lens" is given. The inventors examine a further effective means of solving it.

Thus, the inventors conceive knowledge that the origination information correcting value and the gradient information correcting value of light exiting from the back surface of the spectacle lens are almost monotonically increased with respect to change of addition in the progressive lens with the same far-vision power and the same progressive zone length. Based on this knowledge, it is conceived that the origination information correcting value and the gradient information correcting value can be shown by the following formula (k), being an approximation formula.

[Formula 11]

$$f(\lambda,\rho,\theta) = f_0(\rho,\theta) + f_1(\rho,\theta)A + f_2(\rho,\theta)A^2 \quad (k)$$

Note that, f is any one of the origination information correcting value and the gradient information correcting value in case of the progressive lens, and A is addition. $f_0$, $f_1$ and $f_2$ are values obtained by a least-square method and are shown by the following formula (l).

[Formula 12]

$$f_0(\rho, \theta) = \sum_i \left( \sum_j C_{0ij} B_j(\theta) \right) B_i(\rho)$$

$$f_1(\rho, \theta) = \sum_i \left( \sum_j C_{1ij} B_j(\theta) \right) B_i(\rho) \quad (l)$$

$$f_2(\rho, \theta) = \sum_i \left( \sum_j C_{2ij} B_j(\theta) \right) B_i(\rho)$$

Note that, the above formula (l) is a formula in which distribution on the lens surface is expressed by two dimensions polar coordinate B-spline, and $\rho$ and $\theta$ are polar coordinate expression on YZ plane.

By preparing the above formula (k) and making change due to addition similar to quadratic polynomial equation, the correcting component parameter (spline data distributed on the lens, of the origination information correcting value and the gradient information correcting value) can be reconstitutioned for the progressive surface with respect to all addition, by a small amount of data. As a result, it becomes possible to reappear the correcting component parameter (origination shift correcting value and gradient information correcting values etc) for all addition. Therefore, a problem of greatly increasing the shape data of the optical surface of the spectacle lens, can be solved further effectively. Then, it becomes possible to further reduce a load of a simulation process.

Note that, origination shift of exiting light and gradient information value two dimension B-spline data based on the addition distribution made in that way, can be adapted not only to the lens with constant spherical power, but also to the spectacle lens (for example, a power range covered by a semi-finished lens with the same curve) with spherical power and astigmatism power changed in some extent from the constant spherical power. Provided that the data is prepared with respect to a few kinds of the semi-finished lens, the progressive lens can be covered for all addition range.

Note that, in a case of free-form surface lens (particularly free-form surface progressive lens), strictly speaking, aspherical shapes are different from each other corresponding to each of far-vision power, astigmatism, astigmatism axis angles and addition. In this case, corresponding to all of far-vision power, astigmatism and addition to be assumed, it is necessary to previously prepare two dimensions B-spline data for calculating the correcting component parameter. However, if trying to prepare that, the data becomes enormous.

In this case as well, the above embodiment can be applied. Namely, by preparing an amount of change caused by far-vision spherical power and caused by astigmatism separately among the correcting component parameters of each lens with the same nominal curve, and by approximating using line shape or quadratic expression, an amount of data can be reduced. Also, an amount of change caused by astigmatism can be corresponded to a lens with prescribed astigmatism axis angles, by rotation corresponding to the astigmatism axis angles, thereby to become unnecessary to prepare the data of the amount of change caused by astigmatism with respect to all of the astigmatism axis angles. Specific examples will be shown as follows.

Here, the following case is considered that, for example, a power range covered by a blank (body of a lens material) with determined curve value is set as −2.00 to +2.00, representative spherical power $S_0$ is set as 0.00 and astigmatism C is set as 0 to −4.0. Distributions of the origination information correcting value and gradient information correcting value in any power within this range, are shown as the following formula (m):

[Formula 13]

$$f(S_0 + \Delta S, C, \rho, \theta) = f(S_0, 0, \rho, \theta) + \Delta f_S(\Delta S, \rho, \theta) + \Delta f_C(C, \rho, \theta - \alpha) \quad (m)$$

Here, $f(S_0, 0, \rho, \theta)$ is an amount of correction in the representative spherical power $S_0$, $\Delta f_S(\Delta S, \rho, \theta)$ is an amount of correction caused by a difference $\Delta S$ of spherical power from the representative spherical power $S_0$ and $\Delta f_C(C, \rho, \theta - \alpha)$ is an amount of correction in the astigmatism. $\alpha$ is an astigmatism axis angle. $f(S_0, 0, \rho, \theta)$ is previously obtained by the above method using the formula (k) and (l). In addition, $\Delta f_S(\Delta S, \rho, \theta)$ and $\Delta f_C(C, \rho, \theta - \alpha)$ are defined by a monotonic function of $\Delta S$ and C, to thereby be approximated to the following formula (n):

[Formula 14]

$$\Delta f_S(\Delta S, \rho, \theta) = \Delta f_{S0}(\rho, \theta) + \Delta f_{S1}(\rho, \theta) \Delta S + \Delta f_{S2}(\rho, \theta) \Delta S^2$$

$$\Delta f_C(C, \rho, \theta) = \Delta f_{C0}(\rho, \theta) + \Delta f_{C1}(\rho, \theta) C + \Delta f_{C2}(\rho, \theta) C^2 \quad (n)$$

The above $\Delta f_{S0\text{-}2}$ and $\Delta f_{C0\text{-}2}$ are obtained by such as a least-square method and are saved as a spline interpolating coefficient data. Specifically, they are obtained by the following (o):

[Formula 15]

$$\Delta f_{S0}(\rho, \theta) = \sum_i \left( \sum_j C_{S0ij} B_j(\theta) \right) B_i(\rho)$$

$$\Delta f_{S1}(\rho, \theta) = \sum_i \left( \sum_j C_{S1ij} B_j(\theta) \right) B_i(\rho)$$

$$\Delta f_{S2}(\rho, \theta) = \sum_i \left( \sum_j C_{S2ij} B_j(\theta) \right) B_i(\rho) \quad (o)$$

$$\Delta f_{C0}(\rho, \theta) = \sum_i \left( \sum_j C_{C0ij} B_j(\theta) \right) B_i(\rho)$$

$$\Delta f_{C1}(\rho, \theta) = \sum_i \left( \sum_j C_{C1ij} B_j(\theta) \right) B_i(\rho)$$

$$\Delta f_{C2}(\rho, \theta) = \sum_i \left( \sum_j C_{C2ij} B_j(\theta) \right) B_i(\rho)$$

Here, B indicates B-spline base function and C indicates a coefficient thereof.

In summary, in the above case, "origination information correcting value" and "gradient information correcting value" among "correcting component parameter" in the embodiment 1 are also determined by "an amount of correction in the representative spherical power", "an amount of correction caused by a difference of spherical power from the representative spherical power" and "an amount of correction in the astigmatism" in a case of using a nominal curve surface lens. Further when taking "spherical component parameter" caused by "a spherical element (such as spherical power and astigmatism)" providing "origination information" and "gradient information" in consideration, these amounts of correction may be dealt as "spherical component parameter". Further, the above amounts of correction may be totally dealt as "aspherical component parameter". Similarly, the above amounts of correction may be included in "an aspherical element" or included in "a spherical element".

Embodiment 3

As one example of the embodiment 1, it is given that the spherical component parameter is also obtained by using the ray trace method. Meanwhile, the spherical component parameter greatly varies according to spherical power, astigmatism and prism power. Therefore, with respect to the spherical component parameter as well, an amount of the data becomes increased greatly. Furthermore, as the problem of the invention, "great increase of the shape data on the optical surface of the spectacle lens" is given. Similar to the embodiment 2, the inventors examine a further effective means of solving it.

Thus, in a case on which a plane optical wave surface is incident to the lens, this inventors find a method of showing a wave surface transformed by the lens and exited from the spectacle lens back surface by the following approximated formula (p), and a method of using gradient information of exited light being a normal line to the wave surface as the spherical component parameter. In this method, a process of the ray trace is skipped, to thereby obtain results fast.

Note that, the following approximated formula (p) indicates an approximated formula of a wave surface immediately after that a plane incident wave surface parallel to YZ plane passes through the spectacle lens, in a case of setting an optical axis direction of the spectacle lens as X axis, setting a vertical direction perpendicular to X axis as Y axis and setting a horizontal direction perpendicular to X axis as Z axis.

[Formula 16]

$$x = -P_y y - P_z z + \frac{1}{2} D_{yy} y^2 + D_{yz} yz + \frac{1}{2} D_{zz} z^2 \quad (p)$$

Here, $P_y$ and $P_z$ indicate Y axis component and Z axis component of gradient information caused by prism power. $D_{yy}$ indicates power in Y axis direction, $D_{zz}$ indicates power in Z axis direction and $D_{yz}$ indicates a clinoaxis component of power.

Note that $P_y$ and $P_z$ are shown by the following formula (q)

[Formula 17]

$$P_y = 0.01 P \sin \beta$$

$$P_z = 0.01 P \cos \beta \quad (q)$$

Here, P is set as prism power and β is set as angles in a prism base direction. Coefficient 0.01 is just for adjusting a unit.

Further, $D_{yy}$, $D_{yz}$ and $D_{zz}$ are shown by the following formula (r).

[Formula 18]

$$D_{yy} = 0.001 \left( S + \frac{1}{2} C(1 + \cos 2\alpha) \right)$$

$$D_{yz} = 0.001 \left( -\frac{1}{2} C \sin 2\alpha \right) \quad (r)$$

$$D_{zz} = 0.001 \left( S + \frac{1}{2} C(1 - \cos 2\alpha) \right)$$

Here, S is set as spherical power, C is set as astigmatism and α is set as astigmatism axis angles. Coefficient 0.001 is for adjusting a unit. A unit of x, y and z in the formula (i) is mm and a unit of S and C power is 1/m.

Further, gradient information $k_y$ in Y axis direction and gradient information $k_z$ in Z axis direction are shown by the following formula (s).

[Formula 19]

$$k_y = -\frac{\partial x}{\partial y} = P_y - D_{yy} y - D_{yz} z$$

$$k_z = -\frac{\partial x}{\partial z} = P_z - D_{yz} y - D_{zz} z \quad (s)$$

Namely, by obtaining an optical trace after that light passes the spectacle lens, based on the above formula (p), and considering the trace, the simulation image is generated without using the ray trace method.

Therefore, it becomes possible to calculate the spherical component parameter (namely to calculate the origination coordinate of exited light and gradient information). Thus, only ray trace calculation for the correcting component parameter may be performed, to thereby make the ray trace unnecessary for the spherical component parameter. In addition to this embodiment, by further combining the embodiment 2, an amount of data necessary for simulation can be greatly reduced. Note that, with respect to accuracy, accuracy in a case of an actual skew ray trace is higher than the accuracy of the spherical component parameter obtained by this method. Meanwhile, calculation can be skipped, to thereby realize a small amount of data and improve a calculating speed. When high speed calculation is required, this effect is especially important.

Embodiment 4

In the embodiment 1, an example of obtaining the aspherical component parameter (namely the spherical component parameter and the correcting component parameter) is given as the whole spectacle lens. Except for that, for example, in a case of the spectacle lens with both front and back surfaces aspherical, it is also considered that the aspherical component parameter (the correcting component parameter) of the whole spectacle lens is calculated by obtaining the aspherical component parameter (the correcting component parameter) for each surface and then adding those with each other.

As a specific example is given, first, it is provided that the spectacle lens to be simulated has a predetermined thickness and predetermined prism angles. Then, the spectacle lens with these thickness and prism angles, whose only front surface has an aspherical shape and whose back surface has a spherical shape with predetermined curvature and a toric shape (namely the lens on which only the front surface has an aspherical shape), is prepared. Then, by the method described in the above embodiment, the first correcting component parameter is obtained and recorded for the spectacle lens with only front surface aspherical.

Next, reversely, the spectacle lens with these thickness and prism angles, whose only back surface has an aspherical shape and whose front surface has a spherical shape with predetermined curvature and a toric shape (namely the lens on which only the back surface has an aspherical shape), is prepared. Then, by the method described in the above embodiment, the second correcting component parameter is obtained and recorded for the spectacle lens with only back surface aspherical.

The obtained first correcting component parameter (with only front surface aspherical) is combined with the second correcting component parameter (with only back surface aspherical). Then, this combination is set as the correcting component parameter with both surfaces aspherical in the spectacle lens with both surfaces aspherical being a target of simulation to be obtained.

According to the above method, for example, in a case that an aspherical shape of the front surface is used to each lens with various power in common, when the first correcting component parameter for the aspherical shape of the front surface is known and the data is recorded to such as the data server 4, provided that the back surface has a spherical surface, calculations of the correcting component parameter and further the aspherical component parameter (S109-S110) can be skipped. Also, when the second correcting component parameter for the aspherical shape of the back surface is known and the data is recorded to such as the data server 4, and further, both the aspherical shape of the front surface and the aspherical shape of the back surface are known and both of the correcting component parameter (the first and the second aspherical component parameter) are recorded to such as the data server 4, even if the spectacle lens has greatly complex surfaces being both aspherical surfaces, calculation of the correcting component parameter can be skipped. In addition, a remarkable effect making it possible to precisely perform the simulation of the scaling of the eye image, can be exhibited.

Note that, except for the above method, the following method may be adopted. The spectacle lens with both aspherical surfaces is previously prepared. For example, with respect to the back surface, a spherical element (a spherical surface with a predetermined curvature or a toric surface) included in the aspherical surface shape, is selected and adopted. Then, the first correcting component parameter (with only the front surface aspherical) is obtained. With respect to the second correcting component parameter, it is similar to the above method. Further, a recording means may be suitably set as not only the data server 4 but also such as the data recording means 58, 77.

Hereinafter, another embodiment of this invention is shown as follows.

[Additional Statement 1]

A simulation method for wearing spectacles, comprising:
calculating an aspherical component parameter on a basis of the scaling of the eye image capable of being observed in time of wearing a spectacle lens with at least one of optical surfaces aspherical, and simulating the scaling of the eye image capable of being observed in time of wearing a spectacle lens, based on the aspherical component parameter.

[Additional Statement 2]

A simulation device for wearing spectacles, comprising:
a aspherical component parameter calculating means of calculating a aspherical component parameter being a basis of the scaling of the eye image capable of being observed in time of wearing a spectacle lens with at least one of optical surfaces aspherical;
a simulation means of simulating the scaling of the eye image capable of being observed in time of wearing a spectacle lens, based on the aspherical component parameter, even if the aspherical surface is not known.

[Additional Statement 3]

A simulation system for wearing spectacles, comprising; generating a simulation image by the simulation image generating means, without a basis of a surface shape data of the spectacle lens.

[Additional Statement 4]

A simulation system for wearing spectacles, wherein, at least any one of the aspherical component parameter and the correcting component parameter is obtained by using a ray trace method.

[Additional Statement 5]

A simulation system for wearing spectacles, wherein, in a case that the spectacle lens is a free-form surface lens, in the formula (k), among the correcting component parameter of each lens with the same nominal curve, by preparing an amount of changes caused by far-vision spherical power and caused by astigmatism separately, to thereby be approximated by using line shape or quadratic expression.

[Additional Statement 6]

A simulation system for wearing spectacles, comprising; in a case of the spectacle lens with both aspherical surfaces, in the aspherical component parameter calculating means,
calculating the aspherical component parameter in the spectacle lens with both aspherical surfaces, by combining a first aspherical component parameter obtained from a lens in which only an object side surface among optical surfaces has an aspherical surface and a second aspherical component parameter obtained from a lens in which only an eyeball side surface among optical surfaces has an aspherical surface.

[Additional Statement 7]

A simulation system for wearing spectacles, comprising; in a case of the spectacle lens with both aspherical surfaces, in the correcting component parameter calculating means,
calculating the correcting component parameter in the spectacle lens with both aspherical surfaces, by combining a first correcting component parameter obtained from a lens in which only an object side surface among optical surfaces has an aspherical surface and a second correcting component parameter obtained from a lens in which only an eyeball side surface among optical surfaces has an aspherical surface.

[Additional Statement 8]

A simulation information providing method for wearing spectacles, providing the wearer with simulated-experience of the eye image capable of being observed in time of wearing a spectacle lens, by using a system including a user device set at a shop and a sever device connected with the user device, comprising,
transmitting a simulation image reflected with the scaling of the eye image capable of being observed in time of wearing the spectacle lens, based on an aspherical component parameter, being the spectacle lens parameter identified by the user device, being a basis of the scaling of the eye image capable of being observed in time of wearing the spectacle lens with at least one of optical surfaces aspherical or a data required for generating the simulation image, from the server device to the user device, providing the wearer with simulated-experience of the eye image capable of being observed in time of wearing spectacles, by displaying the simulation image on a simulation image displaying means of the user device.

DESCRIPTION OF SIGNS AND NUMERALS

1 Spectacle shop
2 Simulation center
3 Communication line
4 Data server
11 Ordering side device
11a Computer portion
11b Operating portion
11c (Simulation image) displaying portion
12 Device for measuring lens location information in front of the eye (location measuring device)
21 Order-receiving side device (computer portion on the simulation center)
24 Communication line
51 Data input receiving means
52 Information obtaining means
53 Control means
55 Data correcting means
56 Order processing means
57 Simulation image receiving means
58 Data recording means (ordering side device)
61 Lens designated information
62 Layout information
63 Spectacle frame information
64 Spectacle lens information
65 Ordered data
66 Received data
71 Received order processing means
72 Spherical component parameter calculating means
73 Correcting component parameter calculating means
74 Aspherical component parameter calculating means
75 Simulation image generating means
76 Simulation image transmitting means
77 Data recording means (order-receiving side device)

What is claimed is:

1. A simulation system for simulating an appearance of a wearer's face wearing spectacles with accurate eye scaling, comprising:
a processor configured to:
calculate a spherical component of a lens of the spectacles, the lens having an aspherical optical surface;
calculate an aspherical component of the lens based on: origination information indicating an incident point and/or an exiting point of light passing through lens, and gradient information indicating a tilt of a ray of light when the light exits from the lens in an optical axis direction; and
generate a simulation image of the wearer's face wearing the spectacles, including eyes, based on: the spherical component, the aspherical component, and lens location information of the spectacles when worn, the lens location information including a distance in the optical axis direction between a portion of an eye of the wearer and an eye-side surface of the lens; and
a display that displays the simulation image.

2. The simulation system according to claim 1, wherein the lens location information is obtained by measuring the distance between the portion of the eye of the wearer and the eye-side surface of the lens.

3. The simulation system according to claim 1, further comprising:
an order-receiving device comprising the processor; and
a location information measuring device measuring the lens location information transmitted to the processor.

4. A simulation system for simulating an appearance of a wearer's face wearing spectacles with accurate eye scaling, comprising:
a processor configured to:
calculate a spherical component of a lens of the spectacles caused by a spherical element constituting at least either of determined spherical power or cylinder power in the lens caused by an optical surface having a spherical shape or toric shape, the lens having an aspherical optical surface, the spherical component including: origination information that indicates an incident point and/or an exiting point of light passing through lens, and gradient information that indicates a tilt of a ray of light when the light exits from the lens in an optical axis direction;
calculate a correcting component that adds correction to the spherical component, the correcting component including an origination information correcting value and a gradient information correcting value caused by an aspherical element excluding the spherical element;
calculate an aspherical component of the lens that is a corrected origination information and a corrected gradient information, based on: the origination information, the gradient information, the origination information correcting value, and the gradient information correcting value; and
generate a simulation image of the wearer's face wearing the spectacles, including eyes, based on: the spherical component, the aspherical component, and lens location information of the spectacles when worn, the lens location information including a distance in the optical axis direction between a portion of an eye of the wearer and an eye-side surface of the lens; and
a display that displays the simulation image.

5. The simulation system according to claim 4, wherein the processor is further configured to:
determine sample points on an optical surface of the lens;
calculate the origination information correcting value and the gradient information correcting value on the sample points by using a ray trace method;
calculate a spline interpolation coefficient by using the origination information correcting value and the gradient information correcting value on the sample points; and
calculate an origination information correcting value and a gradient information correcting value on any point by using the spline interpolation coefficient.

6. A simulation device for simulating an appearance of a wearer's face wearing spectacles with accurate eye scaling, comprising:
a processor configured to:
calculate a spherical component of a lens of the spectacles, the lens having an aspherical optical surface;
calculate an aspherical component of the lens, the aspherical component being based on: origination information indicating an incident point and/or an exiting point of light passing through lens, and gradient information indicating a tilt of a ray of light when the light exits from the lens in an optical axis direction; and generate a simulation image of the wearer's face wearing the spectacles, including eyes, based on: the spherical component, the aspherical component, and lens location information of the spectacles when worn, the lens location information including a distance in the optical axis direction between a portion of an eye of the wearer and an eyeball-side surface of the lens; and a display that displays the simulation image.

* * * * *